United States Patent [19]
Burnett et al.

[11] Patent Number: 5,963,459
[45] Date of Patent: Oct. 5, 1999

[54] 3-D ACOUSTIC INFINITE ELEMENT BASED ON AN ELLIPSOIDAL MULTIPOLE EXPANSION

[75] Inventors: David Storer Burnett, Roxbury; Richard Lovell Holford, Denville, both of N.J.

[73] Assignee: Lucent Technologies Inc., Murray Hill, N.J.

[21] Appl. No.: 08/812,472

[22] Filed: Mar. 6, 1997

[51] Int. Cl.$^6$ ............................. G06F 17/50; G06F 17/00
[52] U.S. Cl. ............................................................. 364/578
[58] Field of Search ............................................ 364/578

[56] References Cited

U.S. PATENT DOCUMENTS 5,604,891  2/1997  Burnett et al. .
5,604,893  2/1997  Burnett et al. .

OTHER PUBLICATIONS

P. Beness, "Infinite elements," Int. J. Num. Methods Eng. 11, pp. 53–64 (1977).
O. C. Zienkiewicz, K. Bando, P. Bettess, C. Emson, and T. C. Chiam, "Mapped infinite elements for exterior wave problems," Int. J. Num. Methods Eng. 21, pp. 1229–1251 (1985).
David S. Burnett "Finite Element Analysis From Concepts To Applications," Addison–Wesley Publishing Company.
Carson Flammer, Spheroidal Wave Functions, Stanford University Press, Stanford, CA, 1957, pp. 6–10.
David S. Burnett, "A Three–Dimensional Acoustic Infinite Element Based on a Prolate Spheroidal Multipole Expansion," The Journal of the Acoustical Society of America, vol. 96, No. 5, Pt. 1, Nov. 1994, pp. 2798–2816.

*Primary Examiner*—Vincent N. Trans
*Attorney, Agent, or Firm*—Martin I Finston

[57] ABSTRACT

In an improvement over conventional finite element techniques, an ellipsoidal infinite element is used for the modeling of acoustic fields in exterior, fluid-filled domains surrounding a structure. This ellipsoidal infinite element is based on a multipole expansion that describes, to arbitrary accuracy, any scattered and/or radiated field exterior to an ellipsoid. Significantly, the respective eccentricities of the three elliptical cross sections of the ellipsoid can take values that are arbitrary and mutually independent. The ellipsoidal infinite element is readily incorporated in any structural or acoustic finite element code.

18 Claims, 17 Drawing Sheets

3-D ACOUSTIC INFINITE ELEMENT BASED ON AN ELLIPSOIDAL MULTIPOLE EXPANSION

FIELD OF THE INVENTION

This invention relates to the finite element method (FEM) and variations and extensions thereof. The FEM is a numerical method for modeling the behavior of physical systems. It is generally carried out with the help of a digital computer. More particularly, this invention relates to the use of the FEM and related methods for simulating the acoustic behavior of a structure surrounded by a fluid medium. Simulations of this kind are useful in order, e.g., to predict the distribution of sound waves scattered or radiated by a structure surrounded by an acoustic medium such as water or air.

BACKGROUND OF THE INVENTION

In the field of computational structural acoustics, the problem of efficiently modeling the acoustic field in large exterior domains has remained a difficult challenge for over a quarter century. Many techniques have evolved. Those historically receiving greatest attention in the literature are: the boundary integral equation method or, as it is often called, the boundary element method (BEM), which is based on the surface Helmholtz integral equation applied to the surface of the structure; and the infinite element method (IEM), which is based on the Helmholtz differential equation (the reduced wave equation), applied to semi-infinite sectors of the domain (which are the infinite elements) that are exterior to an artificial boundary surrounding the structure, with finite elements between the structure and the boundary.

The BEM is the method of choice for most researchers and code developers. Its primary advantage is that it is based on a mathematically rigorous formulation, namely, the Helmholtz integral representation, that (i) satisfies the Sommerfeld radiation condition and (ii) represents the exact solution throughout the exterior domain. In addition, its reduction of the dimensionality of the problem by one has long been thought to be a significant computational advantage. However, we have found that this is actually disadvantageous because of the much greater bandwidth of the equations, due to the inherent global connectivity of the method.

By contrast, infinite elements were hitherto never intended to represent the exact solution, or even an approximate solution, within the element itself. Based on ad hoc physical assumptions or asymptotic theories, they were only meant to provide an approximate non-reflecting condition on an artificial boundary surrounding the structure, thereby enabling a sufficiently accurate solution to be obtained in the finite region interior to the boundary. The solution exterior to the boundary is then usually obtained from the exterior Helmholtz integral, using the pressure and velocity data computed on the surface of the structure.

Two types of infinite elements have previously been used for acoustic applications: the exponential decay and the "mapped" element.

The exponential decay element approximates the spatial decay of the acoustic pressure amplitude by an exponential, $p \propto e^{-\gamma r} e^{-ikr}$, where $\gamma$ is an empirically adjusted positive number and r is any coordinate that extends to infinity. Because this decay function is inconsistent with acoustical theory, the accuracy rapidly deteriorates away from the artificial boundary.

The mapped element is based on the asymptotic form of the field for large r, using the leading terms of the lower order spherical Hankel functions, namely, $$p \propto \left(\frac{\alpha_1}{r} + \frac{\alpha_2}{r} + \cdots\right)e^{-ikr}.$$

Because of the mapping, the element was intended to be usable in any shape and orientation, i.e., not necessarily aligned with spherical coordinate surfaces, thereby permitting the "radial" sides of different elements to emanate from different spherical origins.

However, we have found that for this representation to converge, (i) the elements must lie outside the smallest sphere circumscribing the structure, and (ii) the sides of all elements in a mesh must conform to radial lines emanating from the origin of the single r coordinate in the expansion. Since the fluid region between the circumscribing sphere and the structure must be meshed with finite-size acoustic elements, the total acoustic mesh would become very large and therefore computationally very inefficient for structures of large aspect ratio. Thus, the element is practical only for "chunky" structures, i.e., those that can be closely circumscribed by a sphere. This is a serious limitation for many applications.

An additional problem of the mapped element is that element generation is relatively expensive. Moreover, generation of the matrices for the mapped element requires inversion of an ill-conditioned matrix. This causes quadrature problems at very high frequencies.

In U.S. Pat. No. 5,604,891, entitled "A 3-D Acoustic Infinite Element Based On A Prolate Spheroidal Multipole Expansion," assigned to Applicants' assignee, we described a new infinite element based on a multipole expansion in prolate spheroidal coordinates. This infinite element is also described in D. S. Burnett et al., "A Three-Dimensional Acoustic Infinite Element Based on a Prolate Spheroidal Multipole Expansion," *Journal of the Acoustical Society of America* 96 (November 1994) 2798–2816.

We have found that the use of this infinite element leads to an extraordinary improvement in efficiency in the acoustic modeling of elongate structures (i.e., structures in which one dimension is much longer than the other two). For example, careful benchmark comparisons on structures with a 10:1 aspect ratio have revealed computational speeds that are over 400 times faster than the BEM, to achieve the same answer to the same accuracy. The more elongate the structure, the greater the increase in speed. Therefore, it is expected that speed-enhancement ratios will extend into the thousands for even longer structures.

Since prolate spheroids include spheres as a limiting case, the prolate spheroidal infinite element can also efficiently model structures that are "chunky," i.e., all three dimensions comparable. In such cases the computational speeds relative to the BEM are still dramatic, but not as extraordinary as for elongate structures.

If a structure has a flat, i.e., "disk-like," shape (one dimension much shorter than the other two), the prolate infinite element becomes less appropriate, through probably still faster than the BEM. For such structures, it is more appropriate to use an oblate spheroidal infinite element.

In U.S. Pat. No. 5,604,893, entitled "A 3-D Acoustic Infinite Element Based on an Oblate Spheroidal Multipole Expansion," assigned to Applicants' assignee, we described a new infinite element based on a multipole expansion in oblate spheroidal coordinates. Like the prolate element, this oblate infinite element leads to extraordinary efficiencies in the acoustic modeling of certain structures, namely, generally flat, disk-like structures.

There remains a third class of structural shapes that is characterized by all three dimensions being markedly different; i.e., one dimension is much longer than the second, which in turn is much longer than the third. Such structures could be described as being both long and flat, i.e., strip-like or ribbon-like. Although either the prolate or oblate spheroidal infinite elements would provide extraordinary speed increases for this class, there is another coordinate system that would provide still greater (that is, significantly greater) speed increases: it is the ellipsoidal coordinate system, and it has the additional advantage of including prolate and oblate spheroidal coordinates as special cases. Thus, an infinite element based on the ellipsoidal coordinate system is the most general of all, providing extraordinary computational efficiency for structures of any shape, no matter how disparate their dimensions might be.

SUMMARY OF THE INVENTION

Like the prolate and oblate spheroidal infinite elements mentioned above, the new ellipsoidal infinite element described herein breaks with the tradition that preceded these elements in that it is based on a mathematically rigorous formulation, namely, a new multipole expansion (a power series in $1/r$, where $r$, in this case, is an ellipsoidal radius) that (i) satisfies the Sommerfeld radiation condition and (ii) represents the exact solution throughout the domain exterior to a minimal circumscribing ellipsoid. When the leading terms of the expansion, a polynomial in $1/r$ multiplied by an oscillatory factor, are incorporated in an infinite element, accuracy may be increased arbitrarily throughout the element by increasing the number of terms in the polynomial, analogous to p-extension in conventional polynomial-based finite elements.

The ellipsoidal element improves on the mapped element by removing all of the aforementioned practical limitations. It (i) eliminates the 3-D mapping that mixes together the (troublesome) infinite direction with the (well-behaved) finite directions, (ii) generalizes the circumscribing sphere to a circumscribing ellipsoid in order to accommodate structures of any combination of aspect ratios (even when the three spatial dimensions are very disparate), and (iii) takes advantage of separable coordinates to reduce the 3-D integrals to products of much more cheaply computed 2-D and 1-D integrals, which simultaneously eliminates the ill conditioning.

This circumscribing ellipsoid has three principal cross sections, each an ellipse. When one of these cross sections is a circle, the ellipsoid reduces to a prolate or oblate spheroid as a special case. However, it is significant that in the general case, the eccentricity of each principal cross section is independent of the others. Thus, it is possible, for the first time, to define three independent principal dimensions for the circumscribing ellipsoid.

We believe that the inventive technique is the most computationally efficient technique now available for exterior structural acoustics problems, i.e., problems involving radiation and/or scattering, by structures, into open spaces. In addition, the technique used for this acoustic element can possibly be extended to other types of wave propagation such as electromagnetism and elastodynamics. Our new element is readily integrated into any structural finite element code.

Finite element codes, in general, are well known and need not be described here in detail. Numerous books are available on this subject, including D. S. Burnett, *Finite Element Analysis*, Addison-Wesley, Reading, Mass., 1987 (reprinted 1988), which is hereby incorporated by reference.

OVERVIEW OF THE FINITE ELEMENT METHOD

Figure 1A:
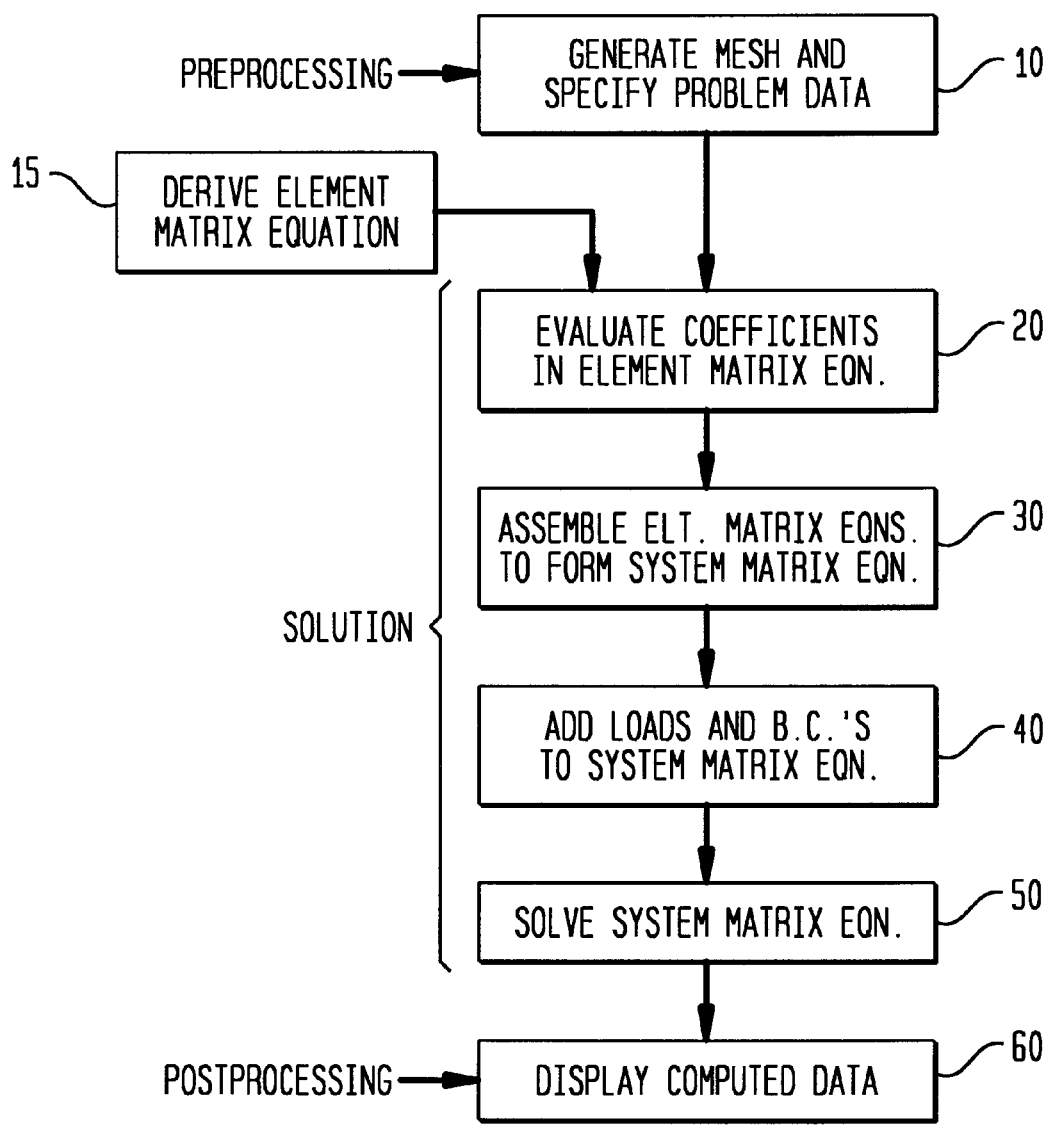
FIG. 1A is a flowchart illustrating the basic steps in the use and operation of a finite element code.

The finite element method (FEM) is a method, performed with the help of a computer, for predicting the behavior of a physical system by obtaining numerical solutions to mathematical equations that describe the system and its loading conditions. The use of the FEM may be thought of as comprising three phases: preprocessing, solution, and postprocessing. These phases are now discussed in further detail with reference to FIG. 1A.

In the preprocessing phase, the physical domain of the problem is partitioned into a pattern of subdomains of simple geometry, referred to as "elements". The resulting pattern is referred to as a "mesh". In addition, problem data such as physical properties, loads, and boundary conditions are specified. This procedure is represented as step 10 of the figure.

The solution phase comprises steps 20–50 in the figure. In the first of these four steps, numerical values are computed for the coefficients in the "element matrix equation" associated with each element in the mesh. The element matrix equation, the derivation of which is indicated in box 15 of the figure, is a set of numerically computable mathematical formulas that are derived theoretically and implemented into the computer code that forms the FEM program.

During the use of the FEM program, the code for these formulas is accessed by each element in the mesh, and numerical values are computed for the coefficients in the formulas using the geometric and physical data associated with each element.

We are providing, for the first time, a set of such formulas (i.e., the element matrix equation) that is specific to an ellipsoidal acoustic infinite element.

The procedure used in the derivation of the element matrix equation, which is described in detail below, embodies the following general ideas. The unknown field variable, for which the finite-element analysis is seeking a solution (such as the acoustic pressure), is represented approximately within each element as a finite sum of known functions, referred to as "shape" functions. These shape functions are usually chosen to be polynomials. There are unknown parameters in this representation, referred to as "degrees of freedom (DOF)", that become the new unknowns which the finite-element analysis will find values for. The DOF are often the values that the unknown field variable takes at specific points in the element, referred to as "nodes". The purpose of this representation is that when values for the DOF are subsequently computed in step 50, a solution will then be known everywhere, continuously, throughout each element. This is possible because at that stage, both the shape functions and the parameters will be known, and these, together, define the complete solution.

The representation of the unknown field variable in terms of shape functions is then inserted into the governing physics equations (which are, typically, differential or integral equations) that express the physical laws to which the physical system is subject. These calculus equations reduce to a system of linear algebraic equations which, when written in matrix form, is the element matrix equation. The expressions for the coefficients in this matrix equation are manipulated using calculus and algebra until they are in a form that can be numerically evaluated by the computer. These numerical coefficients are the output of step 20.

In step 30, the element matrix equations from all the elements are combined together (i.e., they are said to be "assembled") into one large "system matrix equation." The matrices associated with elements that touch each other in the mesh will partially overlap, thereby establishing continuity in the field variable from element to element. Since the overlap is partial, the system matrix grows larger and larger as element equations are assembled, resulting in one very large system matrix.

The system matrix equation is then modified (step 40) to take account of the boundary and loading conditions. The system matrix equation is then solved (step 50), using conventional techniques of numerical analysis. Although there may be thousands, or even hundreds of thousands, of unknown DOF, the solution of this matrix equation is generally a very tractable problem. That is because the matrix elements tend to assume non-zero values only within a relatively narrow band along the matrix diagonal. A well-known measure of the width of this band (and thus, of the time required for solution) is the "rms half-bandwidth" $B_{rms}$.

In the postprocessing phase, the solution to the system matrix equation is displayed in an appropriate, meaningful form (step 60). In this phase, other useful information may be derived from the solution and likewise displayed. Below, we present a detailed description of the derivation of the element matrix equation for the inventive ellipsoidal acoustic infinite element.

Structural acoustic finite element codes have a wide range of useful applications. By simulating the complete acoustic field in and around a structure and its interaction with the vibrating structure, the design of the structure can be more quickly and efficiently modified (as compared to the current expensive, repeated prototyping procedures) to improve or optimize the acoustic performance, e.g., to reduce the overall sound pressure level or to alter the directivity pattern. Important applications include reduction of environmental noise from machinery, automobiles, aircraft, etc., and quieting of noisy consumer products, such as power tools, appliances and PC fans. Terminal equipment for telecommunications systems (speakerphones, loudspeakers, public phone booths, cellular phones, etc.) can be better designed for echo control, background noise discrimination, active noise cancellation, and speech enhancement. Products in the entertainment industry can be more optimally designed for high sound fidelity: stereo systems, musical instruments and the audio portion of home multimedia centers. There are also military applications to sonar and submarine quieting and acoustic countermeasures.

Apparatus for Practicing the Finite Element Method

Figure 1B:
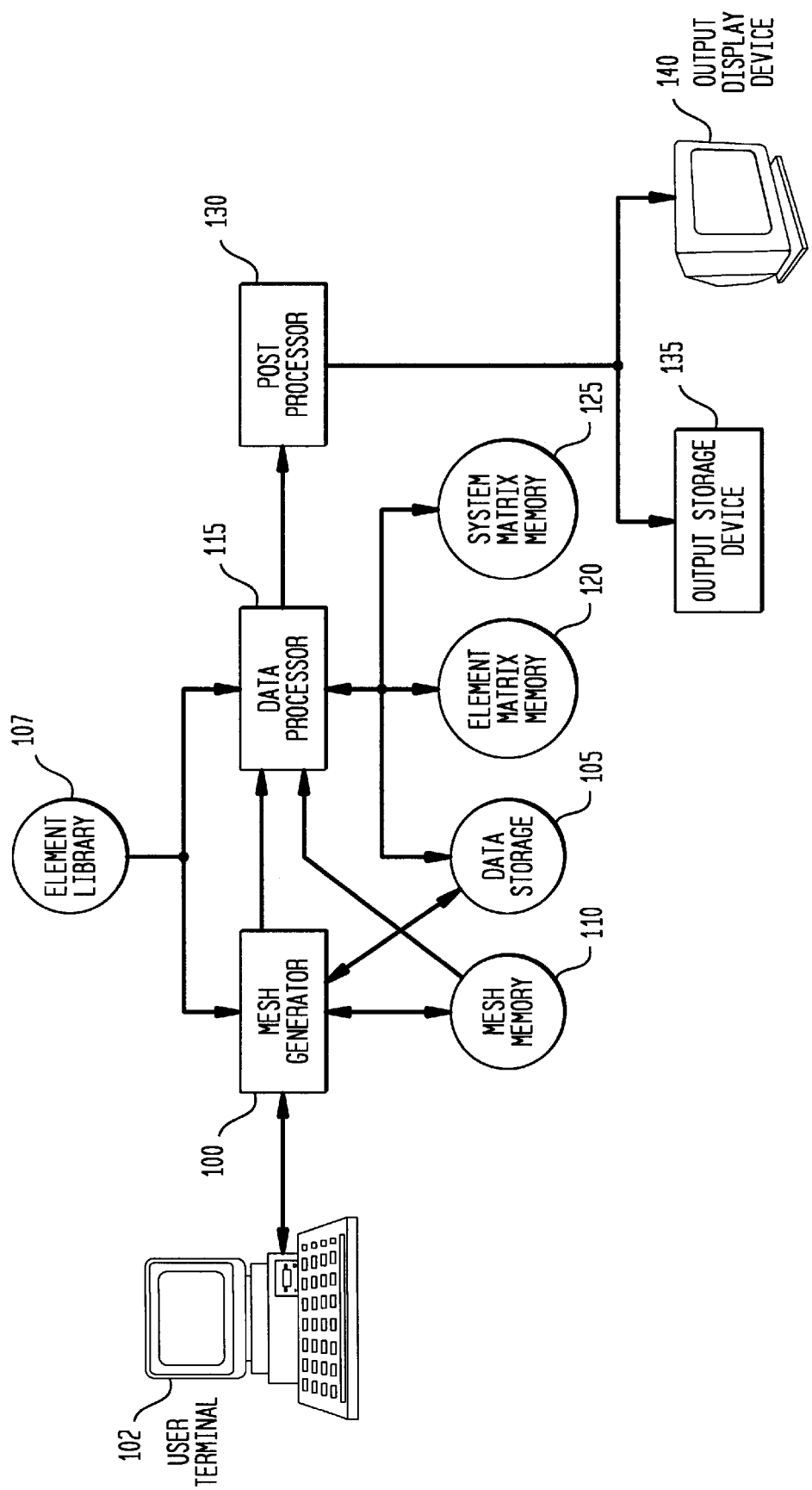
FIG. 1B is a block diagram of exemplary apparatus for practicing the finite element method.

With reference to FIG. 1B, we now describe apparatus useful for practicing the FEM in general and our inventive method in particular.

A mesh generator 100 executes the preprocessing phase 10 of FIG. 1A. It is common practice to use for the mesh generator, a programmed, general-purpose digital computer. Descriptions of the physical system to be modeled may be input to the mesh generator directly from a user terminal 102, or they may be input from a data storage device 105, such as a magnetic disk or a digital memory. The mesh generator will typically call upon a stored library 107 of elements (i.e., of nodal patterns arranged within sectors of triangular and/or quadrilateral cross-section). The mesh and other output data of the mesh generator are stored in memory device 110, which is typically a magnetic disk and also optionally a digital computer memory.

The solution phase (steps 20–50 of FIG. 1A) is also typically carried out in a programmed computer, represented in the figure as element 115. As noted, an intermediate step of the solution phase is the evaluation of the coefficients of the element matrix equations. These coefficients are stored in a digital memory, denoted element 120 in the figure.

It is a general property of the solution phase that as the acoustic frequency increases, the computation time increases exponentially. For this reason, it will often be advantageous to use, for computer element 115, a parallel processor, such as a massively parallel processor or a scalable parallel processor.

Table I gives an indication of the capacity needed by element 120. For acoustic modeling, each infinite element requires two matrices: an acoustic stiffness matrix and an acoustic mass matrix. Each has the same memory requirements, which are listed in the table according to the type of infinite element. Each entry is evaluated by multiplying together 16 bytes (for a double precision word) times the square of the number of degrees of freedom.

In step 30 of FIG. 1A, the element matrix coefficients are assembled into a system matrix equation. The memory element for storing the system matrix coefficients is denoted element 125 in FIG. 1B.

The result of the solution phase is a description of the values assumed by an acoustic field variable throughout the mesh. This information is typically subjected to postprocessing in a processing element denoted 130 in the figure, and output to a storage device 135 or display device 140.

DETAILED DESCRIPTION

A. The Classical Expansion Exterior to a Sphere

Figure 2:
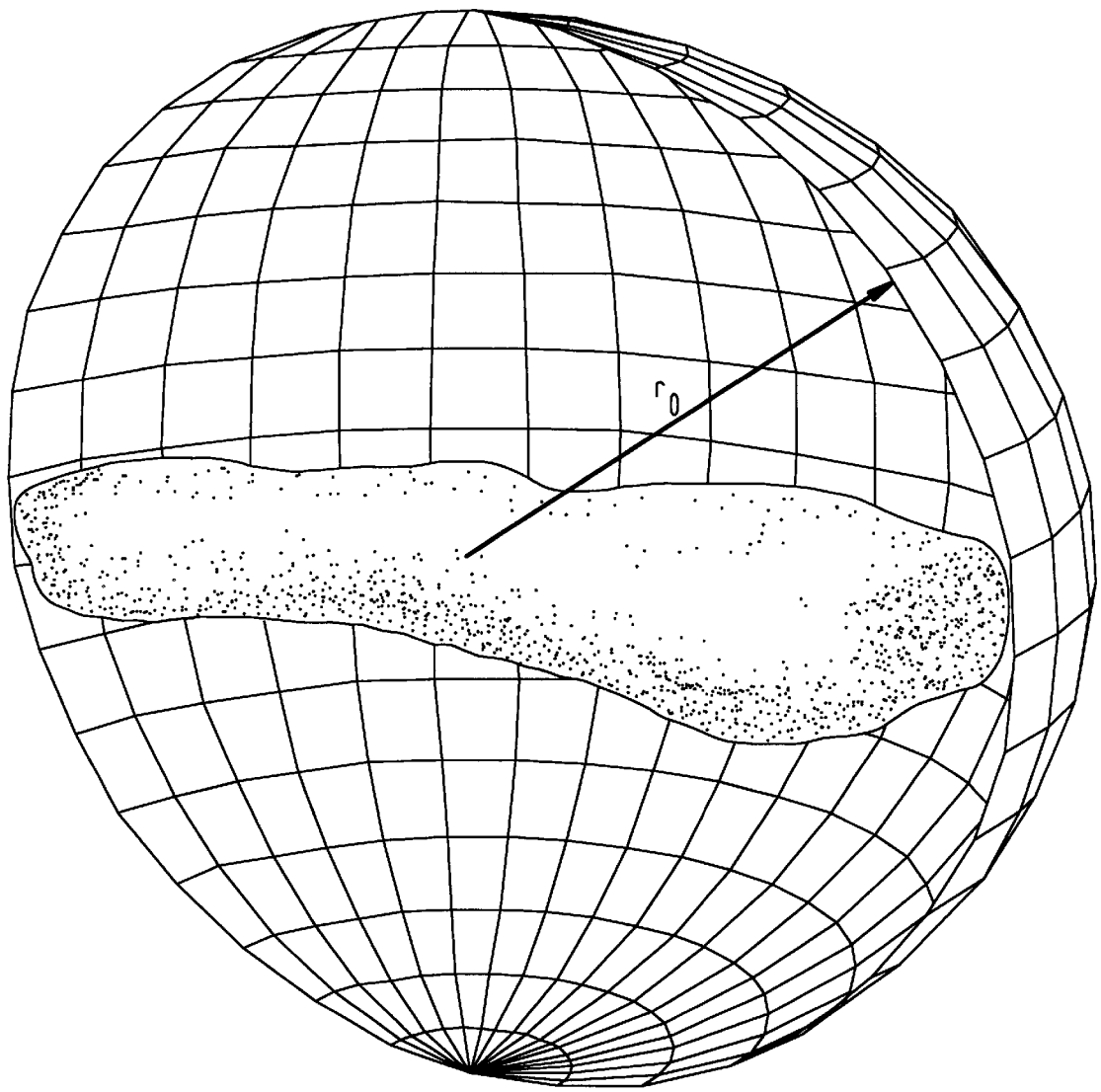
FIG. 2 depicts a 3-D structure of arbitrary shape, together with its smallest circumscribing sphere S, having radius $r_0$.
Figure 3A:
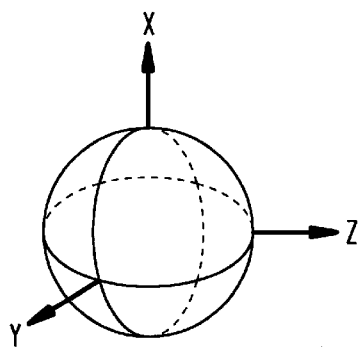
FIGS. 3a–3d depict the closed coordinate surfaces associated with four of the eleven confocal quadric coordinate systems. These surfaces are: (a) sphere; (b) prolate spheroid; (c) oblate spheroid; and (d) ellipsoid.
Figure 3B:
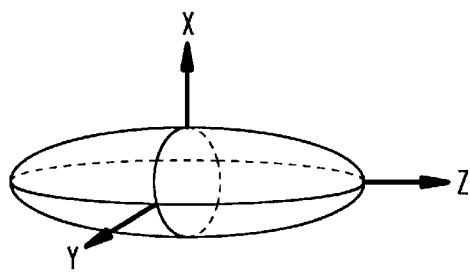
Figure 3C:
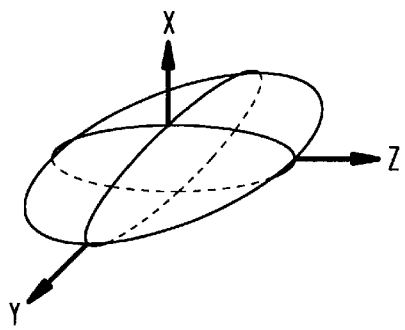
Figure 3D:
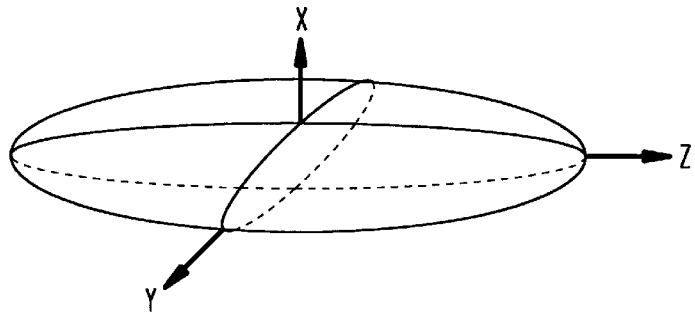

Consider an arbitrary structure immersed in an infinite homogeneous fluid and vibrating at constant circular frequency ω (FIG. 2). Let S be a sphere of minimum radius $r_0$ that just circumscribes the structure, as shown in FIG. 2. It is well known that the scattered and/or radiated pressure p exterior to S can be represented by the following multipole expansion in spherical coordinates r,θ,φ:

$$p = \frac{e^{-ikr}}{r} \sum_{n=0}^{\infty} \frac{F_n(\theta, \phi; k)}{r^n}, \qquad (1)$$

where k is acoustic wavenumber, the $F_n$ are smooth, infinitely differentiable functions, and the series converges absolutely and uniformly in r, θ and φ for $r \geq r_0 + \epsilon > r_0$.

Since Eq. (1) is valid only outside a circumscribing sphere, then infinite elements based on Eq. (1) should only lie outside a circumscribing sphere. The region between the structure and the sphere must therefore be filled with finite-size acoustic elements. This limits the usefulness of such infinite elements to structures that are "chunky", i.e., that fill up most of the space inside a sphere. Long and/or flat structures would need an excessive number of finite-size elements (o DOF for p-type elements) to fill the space and would therefore be computationally expensive to model. Therefore a different multipole expansion is needed, one that is appropriate for non-chunky structures. Since multipole expansions are limited to a specific coordinate system (because they provide an explicit functional form for the "radial" coordinate that goes to infinity), the first step is to select an appropriate coordinate system.

B. Coordinate Systems Appropriate for Structures with Different Ranges of Aspect Ratios FIG. 3 shows the closed coordinate surfaces associated with four of the eleven coordinate systems that comprise, collectively, the "confocal quadric" coordinate systems. (The other seven coordinate systems are not appropriate for the problems addressed by this invention.) The four surfaces depicted are (a) a sphere, (b) a prolate spheroid, (c) an oblate spheroid, and (d) an ellipsoid. The three orthogonal principal cross-sections of all four are ellipses or circles, the latter being merely the special case (i.e., "degenerate" or "limiting" form) of an ellipse.

The ellipsoidal coordinate system is the most general of all, including the other ten as special cases, i.e., degenerate forms. To illustrate, consider the four surfaces in FIG. 3. The three cross sections of the ellipsoid are ellipses, all with different eccentricities (different ratios of major to minor axes). The spheroids may be formed from an ellipsoid by letting two of the elliptical cross sections have the same eccentricity and letting the third cross section degenerate to a circle. For the prolate spheroid, the radius of the circle equals the semi-minor axis of the ellipses; for the oblate, the radius equals the semi-major axis. (An alternative description is that the prolate spheroid is formed by rotating an ellipse about its major axis, the oblate by rotating about its minor axis.) The sphere may be formed from an ellipsoid by letting all three elliptical cross sections degenerate to circles, all of the same radius. (Sometimes all four surfaces are called "ellipsoids," the spheroids and sphere then being characterized as "degenerate" forms.)

The ellipsoid will provide the greatest computational efficiency for any type of structural shape because, by adjusting the eccentricities (shapes) of each of its elliptical cross-sections independently, it can be made to circumscribe the structure as closely as possible in all directions. This means fewer finite-size elements will be needed to fill the region between the structure and the ellipsoid, with resulting faster computational speeds.

C. A New System of Ellipsoidal Coordinates and a New Multipole Expansion Exterior to an Ellipsoid

1. Ellipsoidal Coordinates

The classical ellipsoidal coordinate system (see, for example, P. Morse and H. Feshbach, *Methods of Theoretical Physics*,, McGraw-Hill, 1953, pp. 511–515) has rarely been used for engineering or scientific applications. Its degenerate forms (e.g., spherical, cylindrical, spheroidal, etc.) are usually adequate and mathematically less complicated. Two attributes in particular, namely, a lack of a one-to-one transformation to rectangular Cartesian coordinates and an awkward transition to the limiting spheroidal coordinates, make the classical coordinates unacceptable for this invention.

Therefore, we have developed a new system of ellipsoidal coordinates which has the following important attributes:

1. The transformation to rectangular Cartesian x, y, z coordinates has the essential property that is is one-to-one. This provides a unique mapping between the two systems.
2. The new ellipsoidal coordinates transform smoothly to the limiting cases of prolate and oblate spheroidal coordinates and spheres, with the ellipsoidal coordinates becoming identical to each of these other coordinate systems in the appropriate limit.

It appears likely that this new ellipsoidal coordinate system will have broad practical uses in many fields of engineering and science.

Figure 4A:
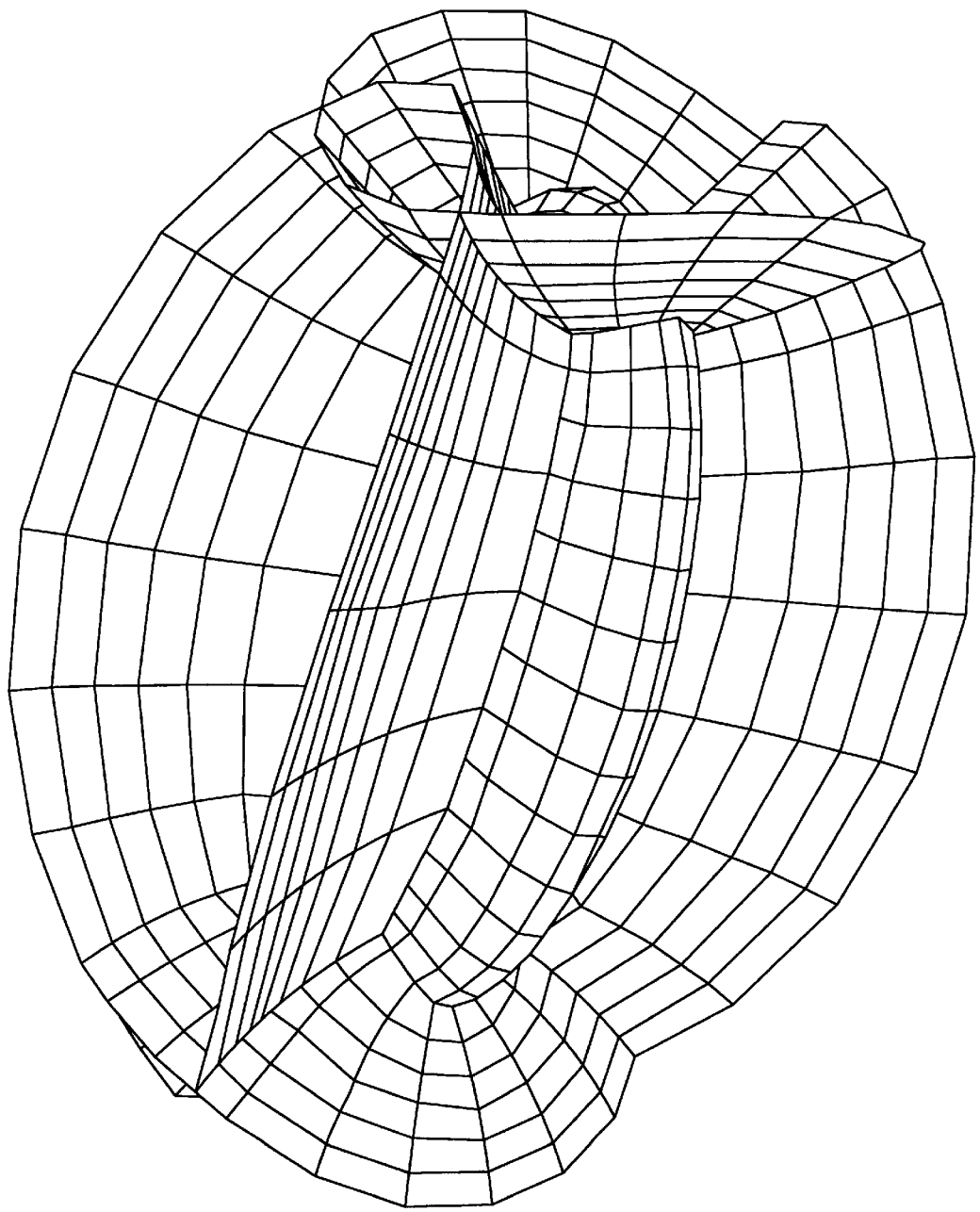
FIG. 4a depicts the three orthogonal coordinate surfaces of a new ellipsoidal coordinate system to be used in connection with the present invention.
Figure 4B:
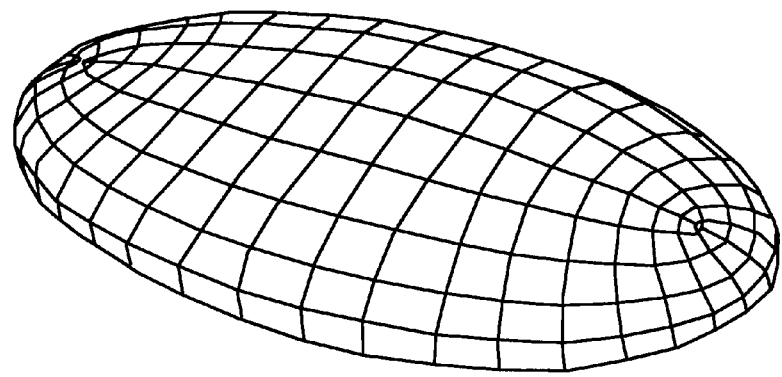
FIGS. 4b–d are an exploded view of these surfaces.
Figure 4C:
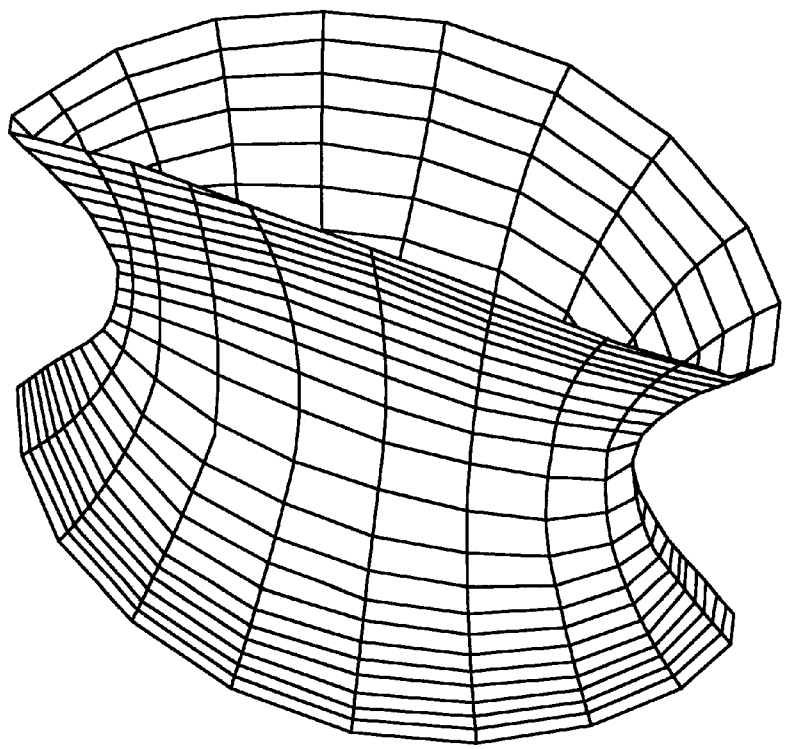
Figure 4D:
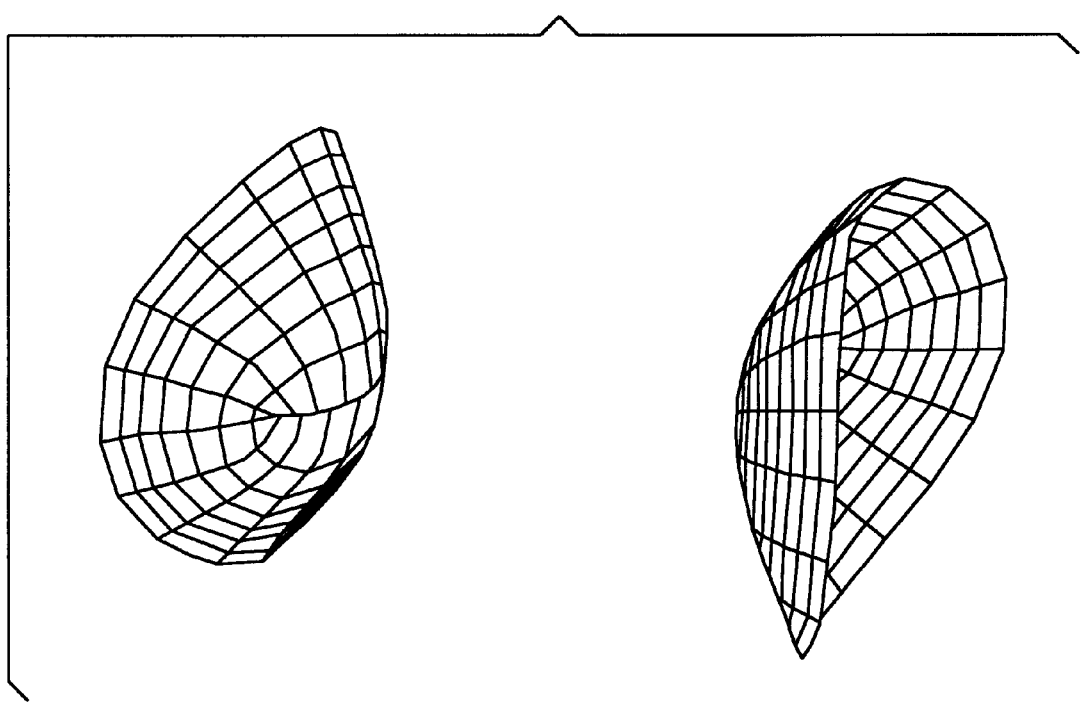

The new ellipsoidal coordinates are labeled r, θ and φ, representing a "radial" variable and two "angular" variables, respectively. They are an orthogonal system of confocal quadric surfaces. The surfaces are shown in FIG. 4a, along with an exploded view in FIGS. 4b, 4c, and 4d. Surfaces of constant r are confocal ellipsoids, constant-θ surfaces are one-sheeted hyperboloids, and constant-φ surfaces are two-sheeted hyperboloids.

We refer to the r coordinate as the "ellipsoidal radius" because it measures distance orthogonal to the ellipsoids, i.e., along hyperbolic paths, analogous to radial paths for spherical coordinates. Indeed, in the limiting case when the ellipsoid degenerates to a sphere, the hyperbolic paths degenerate to straight radial lines.

The θ and φ coordinates are referred to as "ellipsoidal angles" because, in the transformation that defines them [see Eqs. (4) and (5)], they are the arguments of trigonometric sine and cosine functions, and in the limiting cases of spheroids and spheres, they become the traditional angle variables in those systems. These two variables determine position on the ellipsoidal surfaces.

Figure 5:
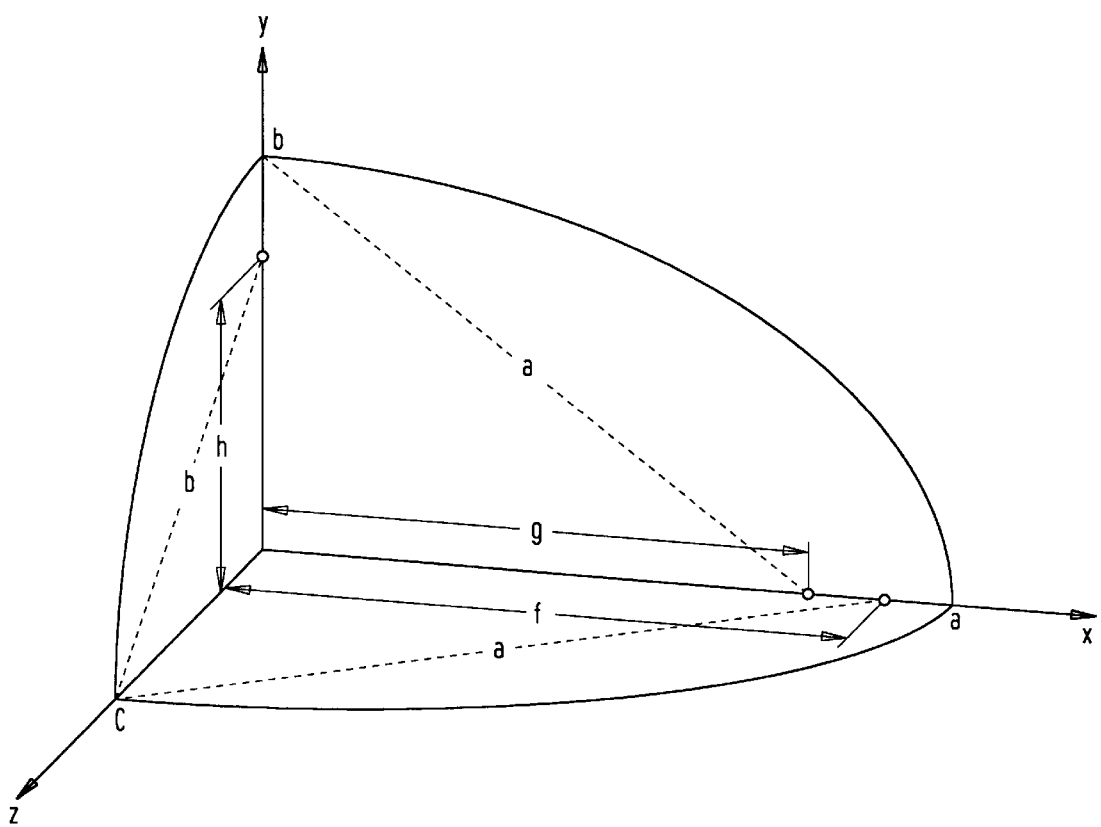
FIG. 5 shows one octant of an ellipsoid and defines the lengths of the three axes of the ellipsoid and the locations of the foci for the three principal elliptical cross sections.

FIG. 5, which shows one octant of an ellipsoid, defines the lengths of the three axes of the ellipsoid and the locations of the foci for the three principal elliptical cross sections.

$2a$=length of major axis, along x axis; x=±a are extrema of ellipsoid.

$2b$=intermediate axis, along y axis; y=±b are extrema of ellipsoid.

$2c$=minor axis, along z axis; z=±c are extrema of ellipsoid.

$$a \geq b \geq c \qquad (2)$$

$2f$=interfocal distance for ellipse in x,z plane; foci at x=±f.
$2g$=interfocal distance for ellipse in x,y plane; foci at y=±g.
$2h$=interfocal distance for ellipse in y,z plane; foci at z=±h.

The semi-major axis, a, and semi-intermediate axis, b, are also the hypoteneuses of triangles that have the foci at one vertex.

$$f^2 = a^2 - c^2 \geq 0 \quad g^2 = a^2 b - b^2 \geq 0 \quad h^2 = b^2 - c^2 = f^2 - g^2 \geq 0 \quad f \geq g \quad (3)$$

Note that only two foci are independent.
If $a \geq b = c$, the ellipsoid degenerates to a prolate spheroid.
If $a = b \geq c$, the ellipsoid degenerates to a oblate spheroid.
If $a = b = c$, the ellipsoid degenerates to a sphere.

The new ellipsoidal coordinates are defined by their transformation from rectangular Cartesian coordinates:

$$x = rQ\cos\phi \quad y = rG\sin\theta\sin\phi \quad r \geq f \geq g \quad z = rFP\cos\theta \quad (4)$$

where $$F = \left(1 - \frac{f^2}{r^2}\right)^{\frac{1}{2}} = (1 - \varepsilon^2)^{\frac{1}{2}} \quad (5)$$

$$G = \left(1 - \frac{g^2}{r^2}\right)^{\frac{1}{2}} = (1 - p\varepsilon^2)^{\frac{1}{2}}$$

$$P = (1 - p\cos^2\phi)^{\frac{1}{2}}$$

$$Q = (1 - q\cos^2\theta)^{\frac{1}{2}}$$

$$p = \frac{g^2}{f^2}$$

$$q = 1 - p$$

$$\varepsilon = \frac{f}{r} = \text{the maximum eccentricity of all three ellipsoidal cross sections.}$$

The variables F, G, P, Q, p, q, $\epsilon$ are all nondimensional and all have the range [0, 1].

2. An Ellipsoidal Multipole Expansion

Figure 6A:
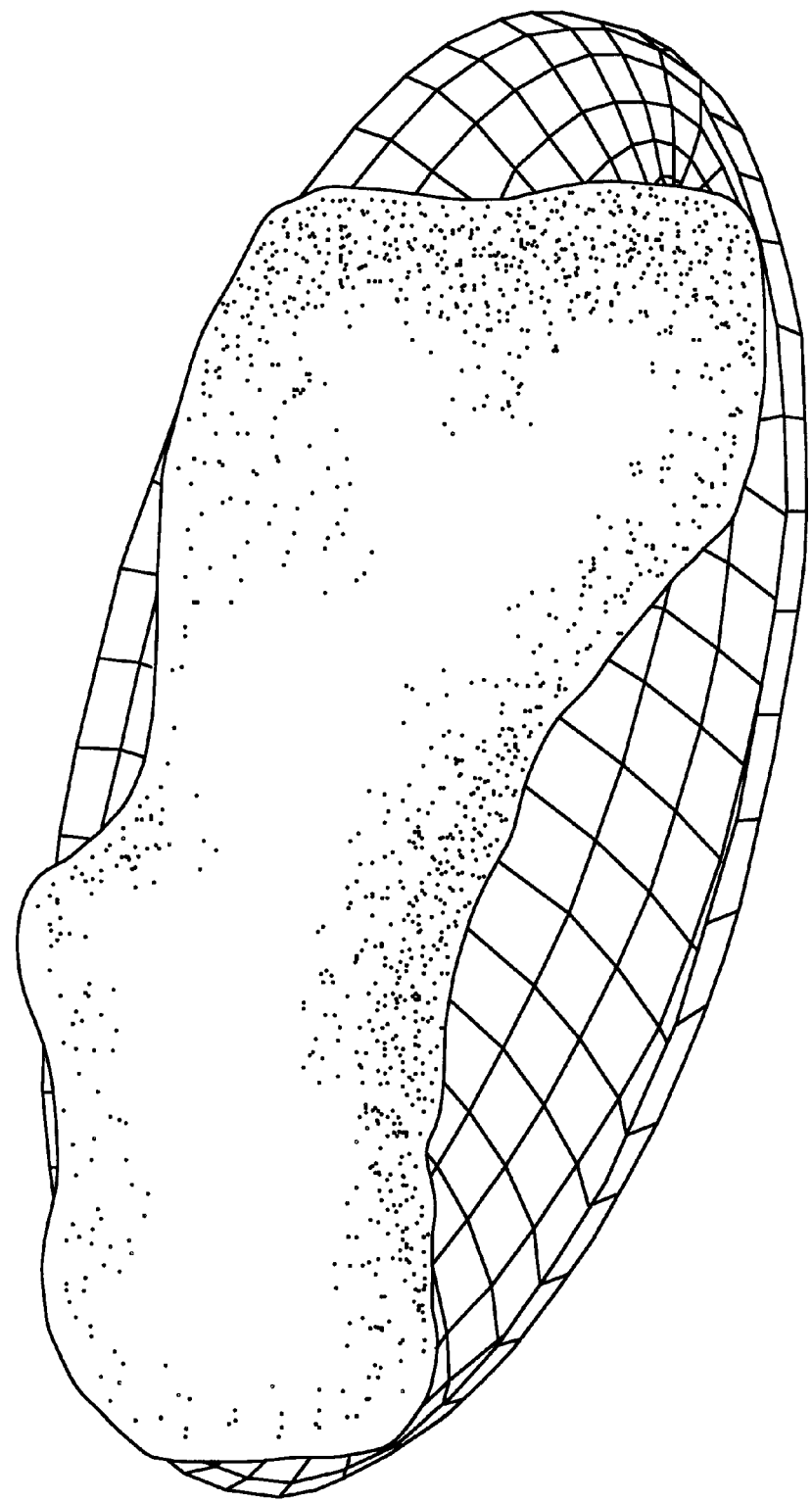
FIGS. 6a–6d depict, in different views, a 3-D structure of arbitrary shape and a circumscribing ellipsoid.
Figure 6B:
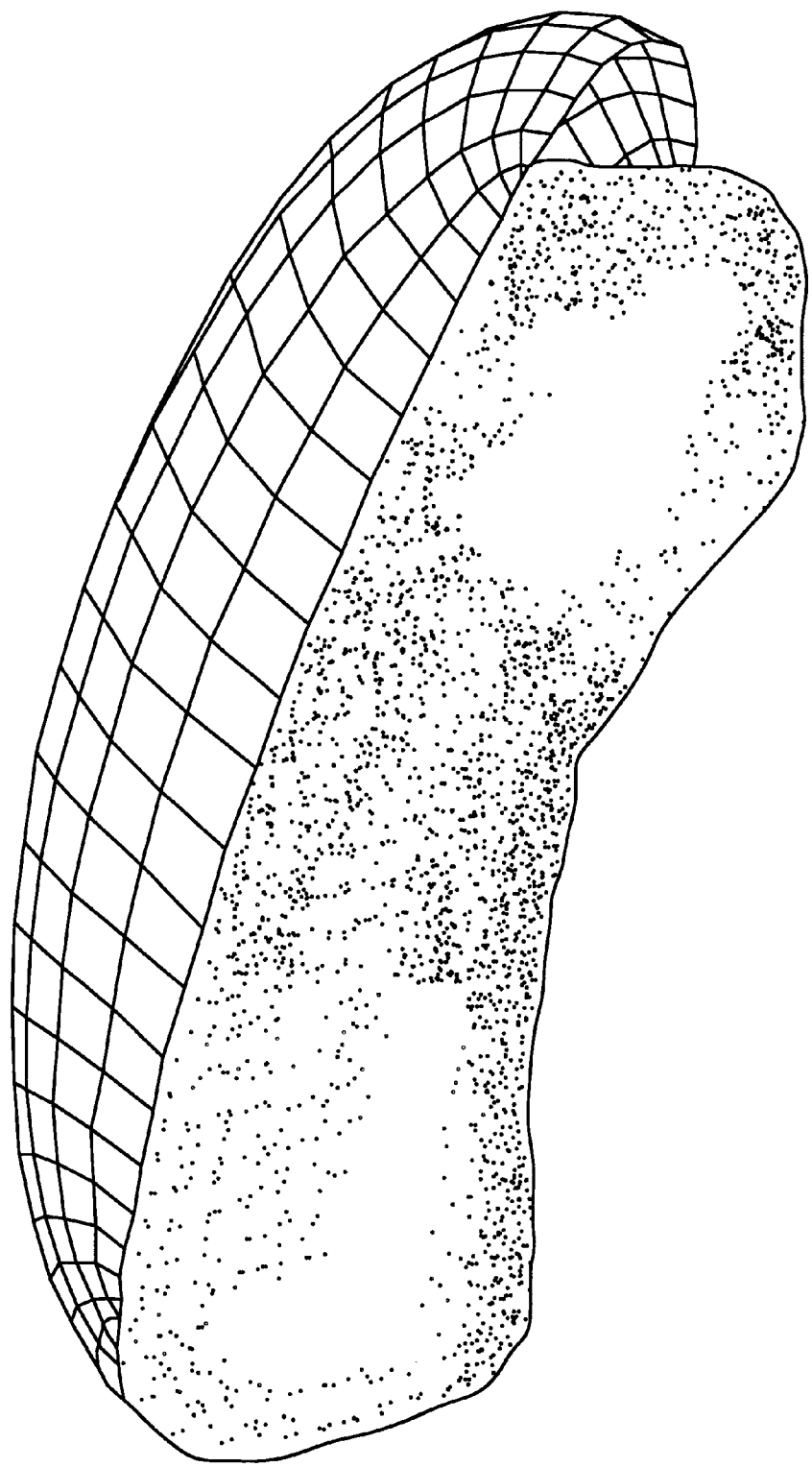
Figure 6C:
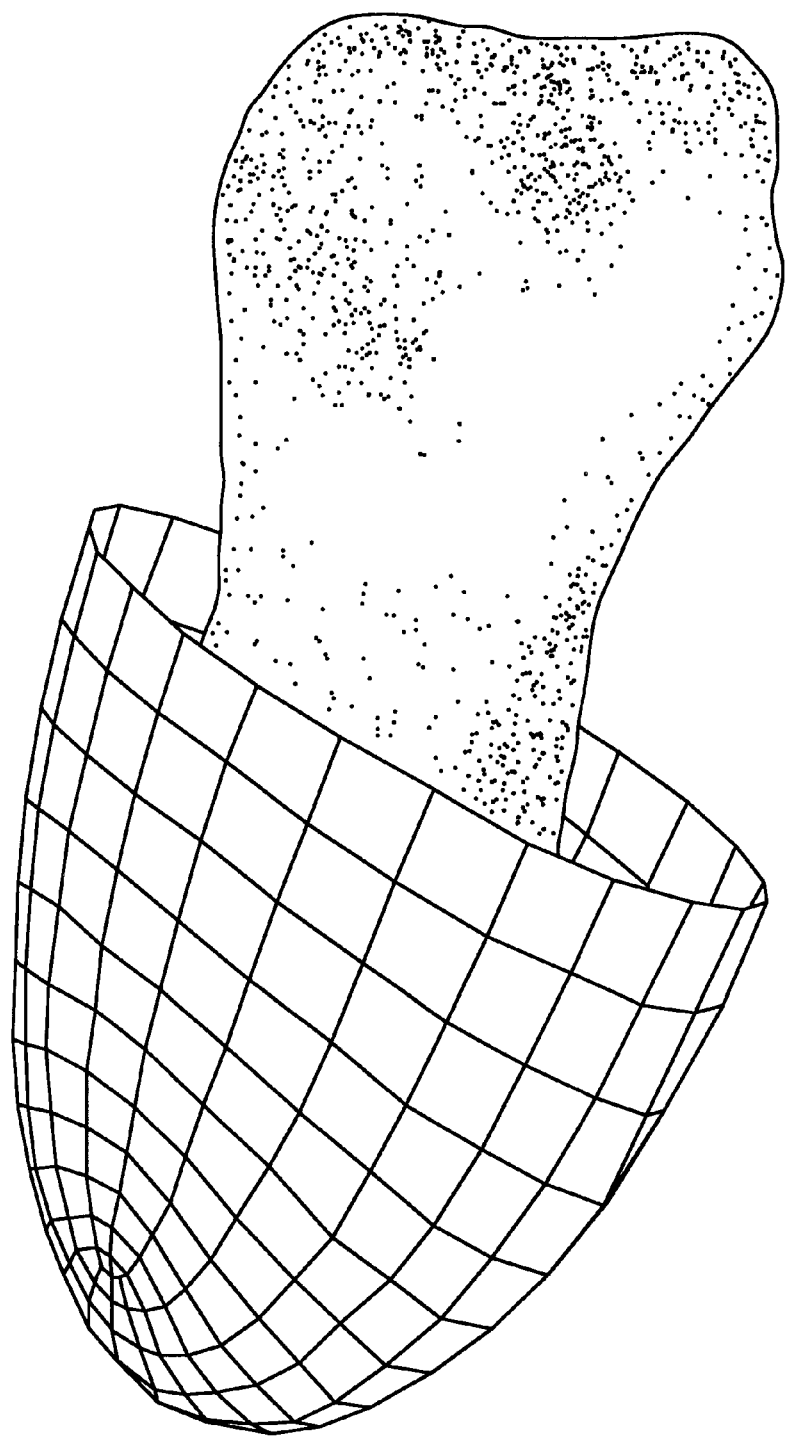
Figure 6D:
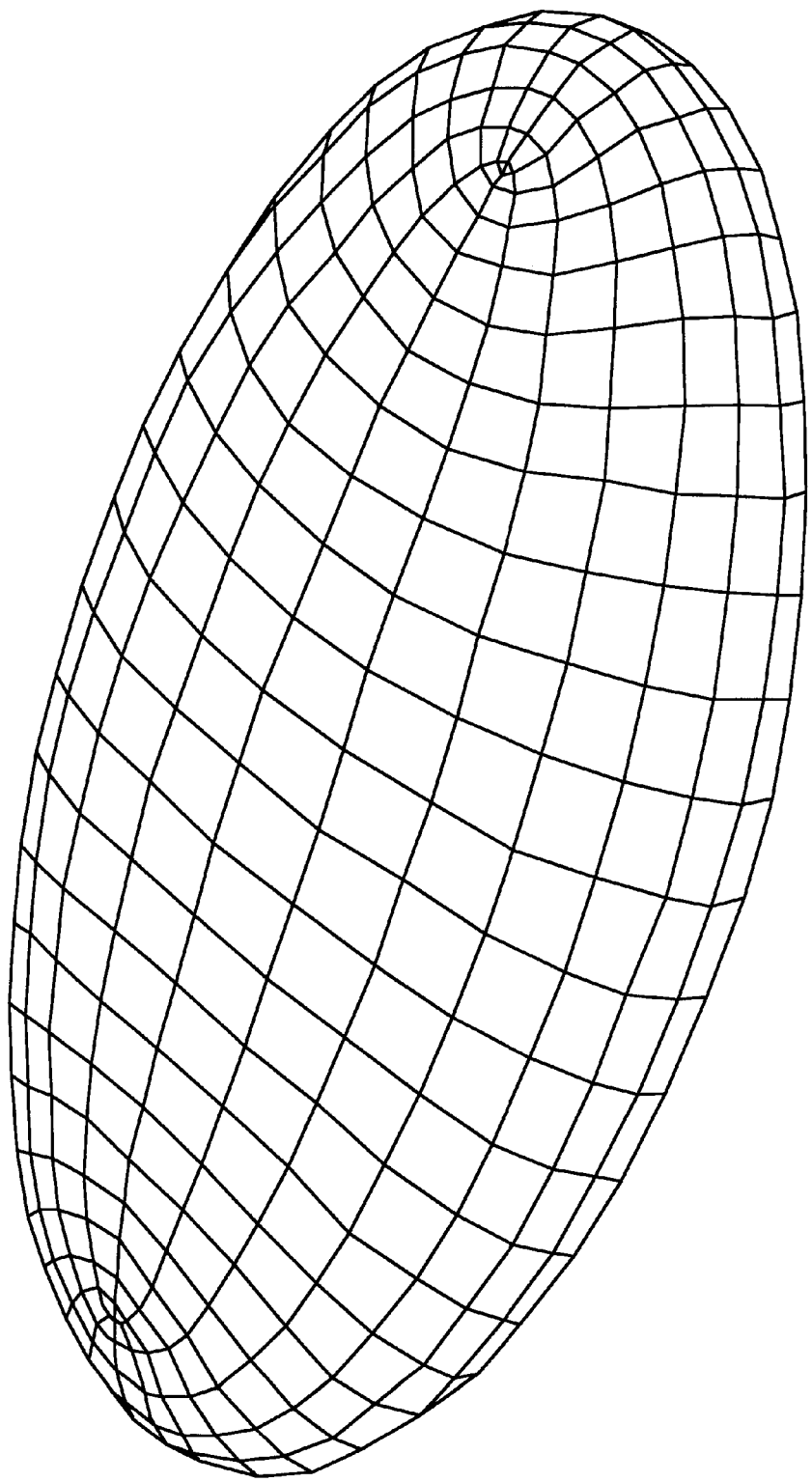

Consider the same structure as in FIG. 2, but now let S be an ellipsoid of ellipsoidal radius $r_0$ that just circumscribes the structure (FIG. 6); i.e., the structure touches, but does not penetrate, the ellipsoid at one or more points. FIG. 6a shows such an ellipsoid, enclosing a structure inside it. FIGS. 6b–6d show the same picture but with half the ellipse cut away, along each of the three principal cross sections, to reveal the structure inside. Because the three axes of an ellipsoid can be varied independently, such a circumscribing ellipsoid is not unique. The following multipole expansion is valid for any circumscribing ellipsoid.

The scattered and/or radiated pressure p exterior to S can be represented by the following multipole expansion in ellipsoidal coordinates r,θ,φ:

$$p = \frac{e^{-ikr}}{r} \sum_{n=0}^{\infty} \frac{G_n(\theta, \phi; k)}{r^n} \quad (6)$$

where, similar to Eq. (1), k is acoustic wavenumber, the $G_n$ are smooth, infinitely differentiable functions, and the series converges absolutely and uniformly in r, θ and φ for $r \geq r_0 + \epsilon > r_0$.

To the best of our knowledge, Eq. (6) represents a new contribution to the art. That is, we are unaware of any previously reported multipole expansion in ellipsoidal coordinates, classical or otherwise.

Eq. (6) is a generalization of Eq. (1), including the latter as a special case. This is because, as noted previously, the ellipsoidal coordinates will degenerate smoothly into spherical coordinates as the three ellipsoidal axes become equal.

D. Geometry of a 3-D Variable Multipole Ellipsoidal Infinite Acoustic Element

Figure 7:
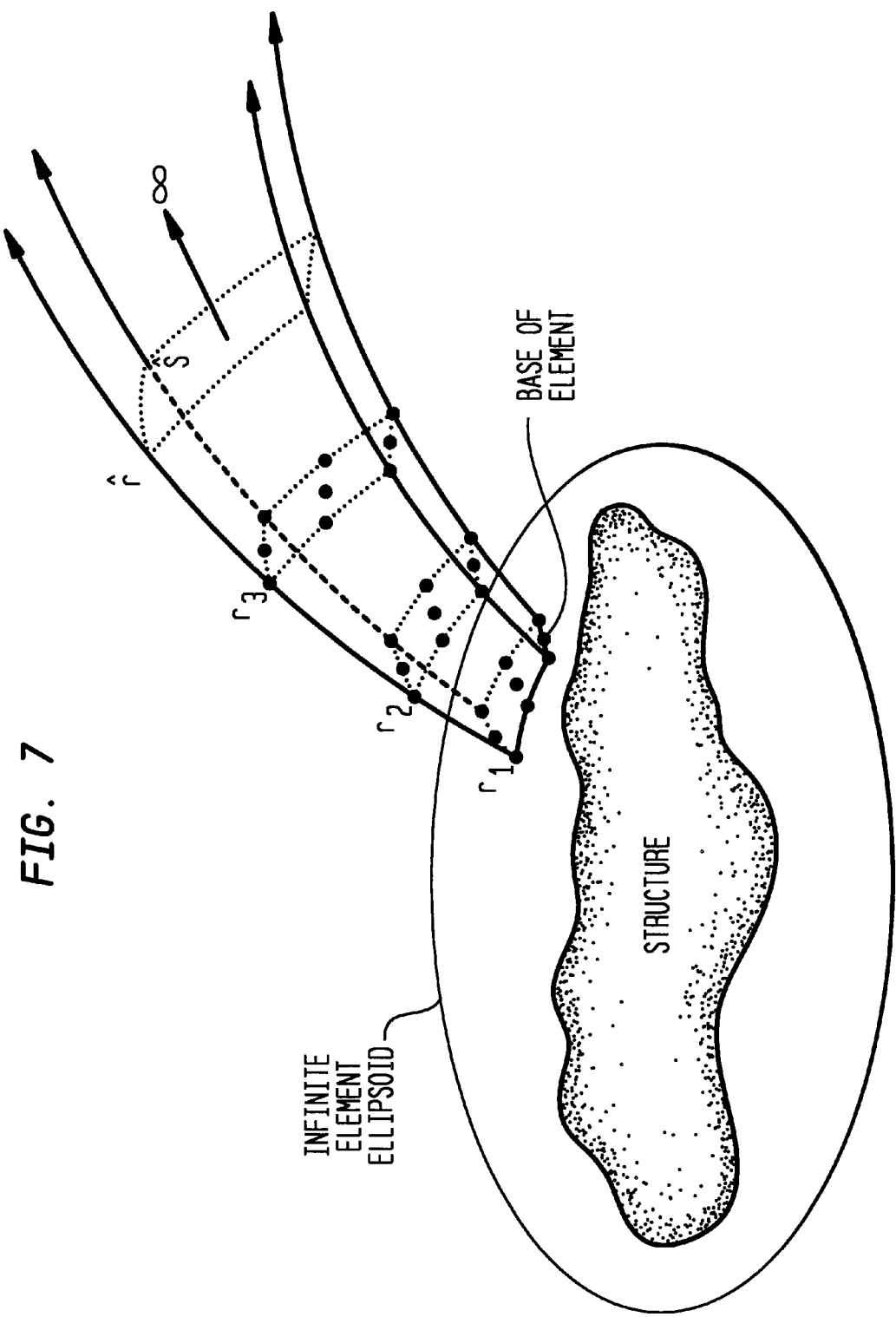
FIG. 7 depicts an illustrative ellipsoidal infinite element.
Figure 8:
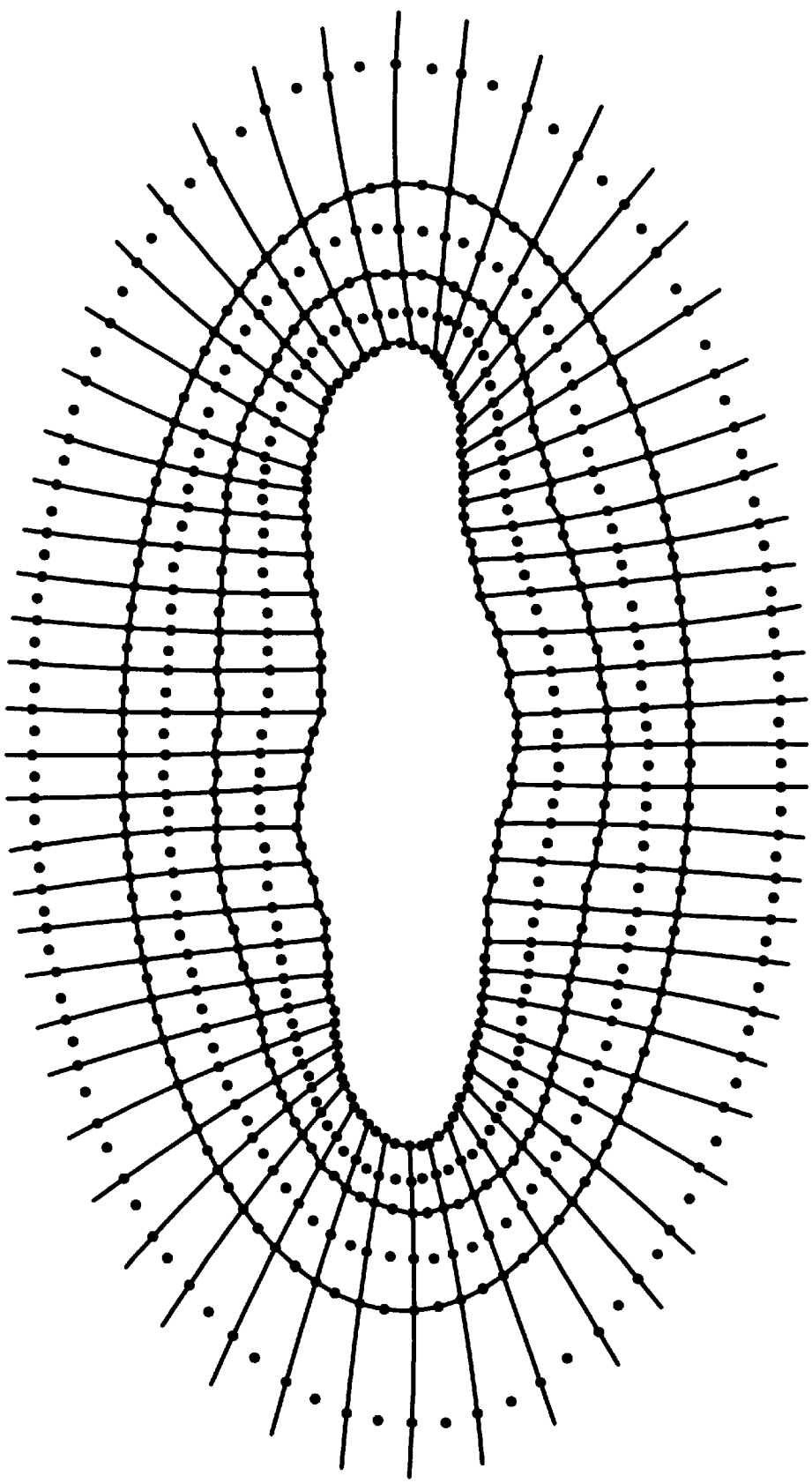
FIG. 8 depicts a typical mesh using infinite elements according to the invention.
Figure 9:
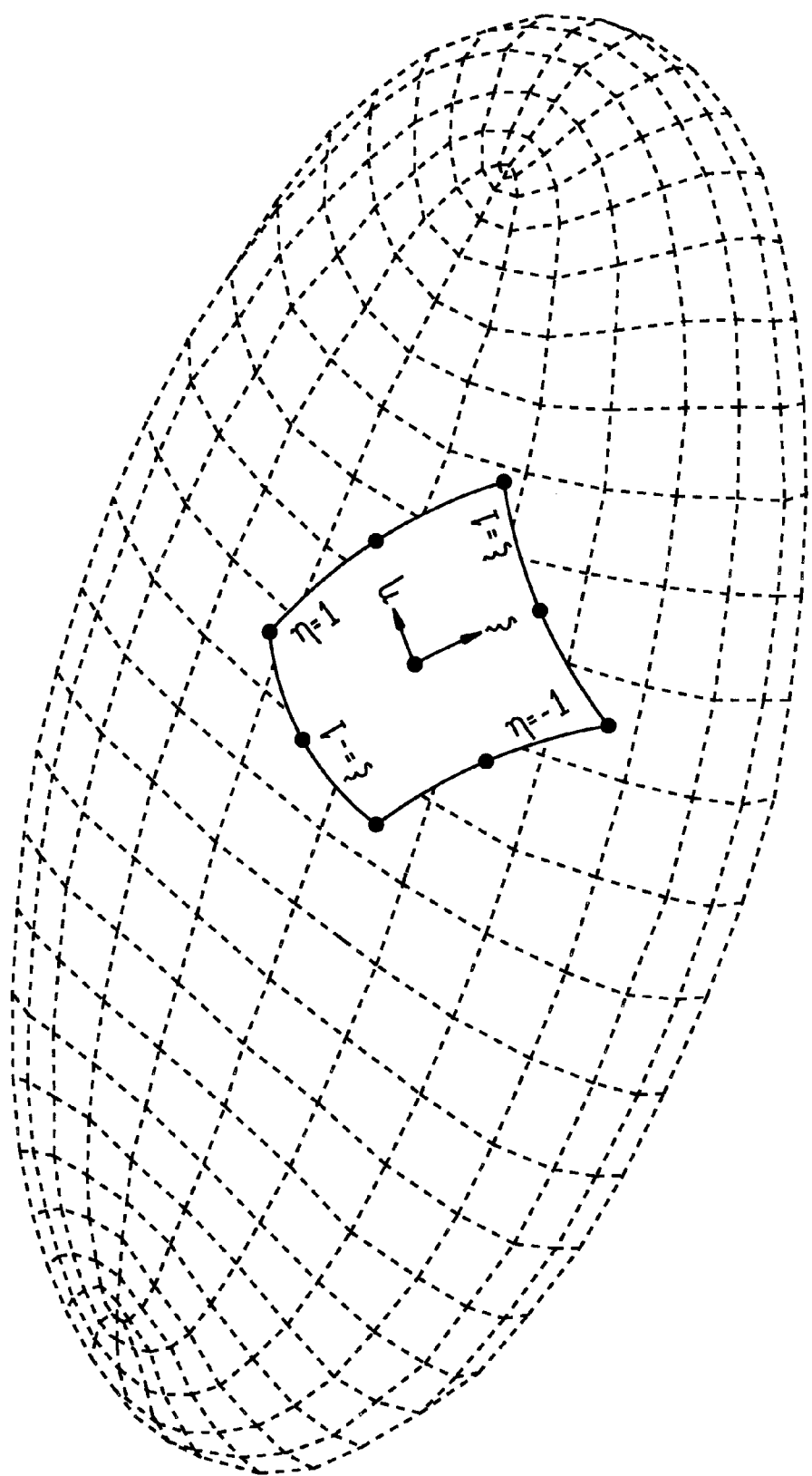
FIG. 9 shows the base of an illustrative infinite element, lying on the infinite element ellipsoid. The dashed lines in the figure are ellipsoidal $\theta$, $\phi$-coordinate lines.

The infinite element is shown in FIG. 7, and a 2-D cross-section of a typical 3-D mesh outside a 3-D body is shown in FIG. 8. One face of the element, the "base", must attach to, and conform to the shape of, an ellipsoidal surface of ellipsoidal radius r 1 surrounding the structure, called the "infinite element ellipsoid". The base may be a curvilinear quadrilateral (shown here) or triangle; it need not conform to the θ, φ coordinate lines (FIG. 9). This permits one to construct a completely general 2-D mesh on the ellipsoid, comprising curvilinear quadilaterals and triangles of any shape and orientation. Any type of FE representation may be used over the base, e.g., Lagrange, serendipity, or hierarchic polynomials of any degree. (The quadratic Lagrange nodal pattern shown here, and in later figures, is for illustrative purposes.)

The infinite element ellipsoid uniquely determines two focal radii, f and g, which in turn define a system of confocal ellipsoids and hyperboloids (see FIG. 4) that are used in the construction of the rest of the element. The side faces of the element are the loci of confocal hyperbolas emanating from the sides of the base. A multipole of order $$m \left( p = \left( \frac{a_1}{r} + \cdots + \frac{a_m}{r^m} \right) e^{-ikr} \right)$$

requires m layers of nodes that are on confocal ellipsoids of ellipsoidal radii $r_1, r_2, \ldots, r_m$. The nodal pattern is identical on each ellipsoid. The value m=2 corresponds to a dipole, m=3 to a quadrupole (as shown in FIG. 7), m=4 to an octupole, etc. A "variable-multipole" element contains a variable number of layers of nodes, permitting the analyst to refine the mesh radially in the infinite region by increasing the multipole order, m, analogous to p-extension for finite-size elements.

Finally, there is an outer ellipsoidal face, $\hat{S}$, at ellipsoidal radius $\hat{r}$, that recedes to infinity in the theoretical development. Thus, in deriving the element matrix equation, the element begins with a finite size, $r_1 \leq r \leq \hat{r}$, so that the Sommerfeld radiation condition can be applied to the outer face, and then the limit is taken as $\hat{r} \to \infty$.

Conventional ξ, η coordinates (illustrated in FIG. 9 for a quadrilateral) are defined over the element cross-section, i.e., on ellipsoids, by the mapping $$\theta(\xi,\eta) = \sum_{v=1}^{n} \theta_v \chi_v^a(\xi,\eta), \quad \phi(\xi,\eta) = \sum_{v=1}^{n} \phi_v \chi_v^a(\xi,\eta), \quad (7)$$

where n is the number of nodes in the quadrilateral or triangle, $\theta_v$, $\phi_v$ are the ellipsoidal angular coordinates of the $v^{th}$ node, and $\chi_v^a(\xi,\eta)$ are interpolation polynomials. (Alternatively, blending functions could be used if the elements are hierarchic.)

Since the base, intermediate nodal layers, and outer face conform to confocal ellipsoids and the side faces are the loci of confocal hyperbolas, the element is a right cylinder in r,$\theta$, $\phi$-space (or r, $\xi$, $\eta$-space) and the 3-D integrals separate into well-conditioned 2-D angular integrals and 1-D infinite integrals. An additional benefit is that the above mapping is limited to just the two finite angular dimensions, i.e., the $\theta$, $\phi$ coordinates, over ellipsoidal surfaces. The radial coordinate uses a separate mapping. This avoids the numerical ill-conditioning associated with 3-D mappings that mix together the infinite dimension with the two finite dimensions.

Figure 10:
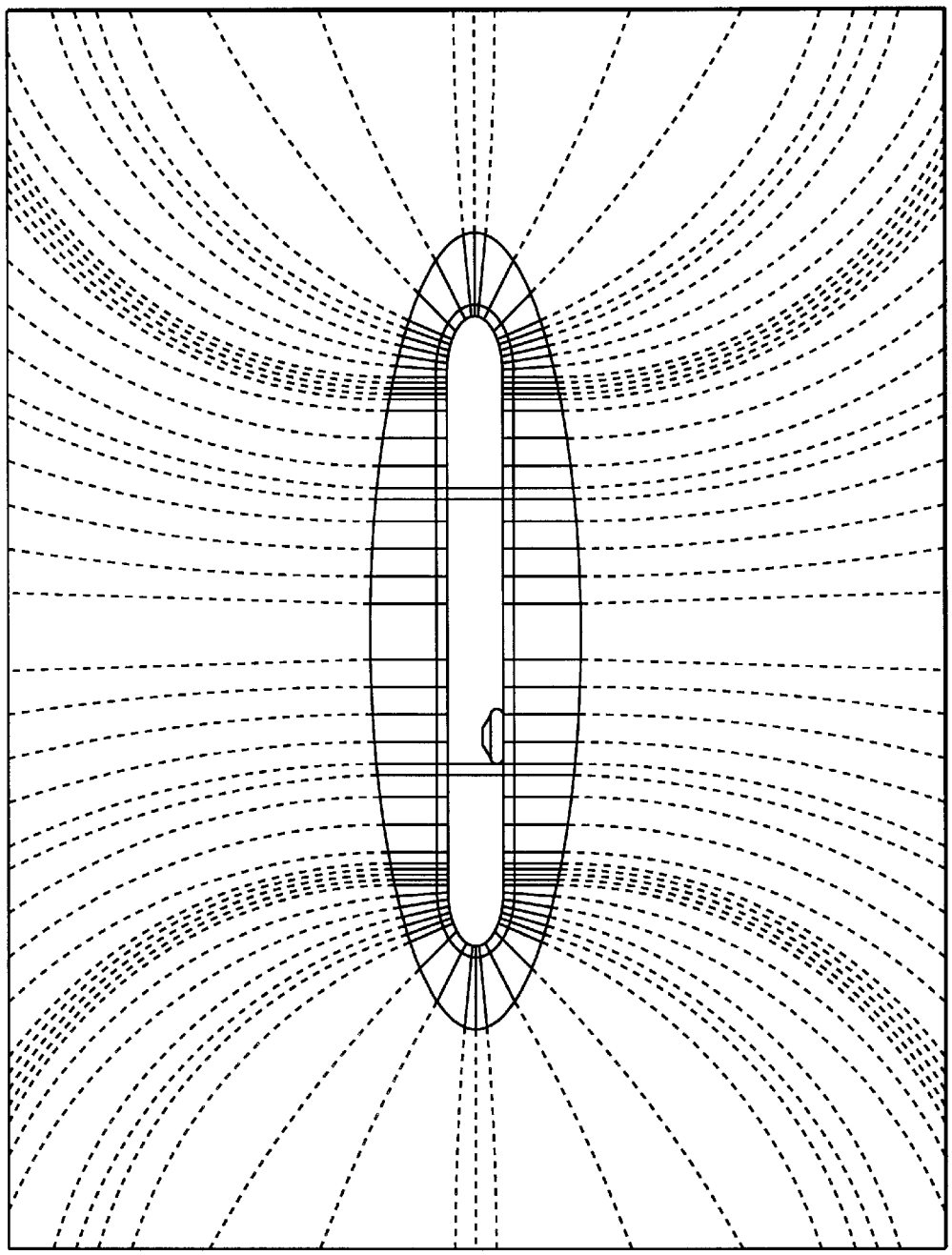
FIG. 10 is a 2-D slice through a 3-D mesh for a typical structural acoustics problem.

The use of these infinite elements is illustrated in FIG. 10, which shows a typical mesh for a structural acoustic problem. It is a cross-section of a 3-D mesh of a structure and the surrounding infinite fluid region. The structure consists of two thin, parallel plates with identical irregular shapes, joined at their edges around the entire perimeter by a thin shell with a rounded conical cross section. Between the plates are some internal structures. There are two layers of finite-size acoustic elements between the structure and the infinite element ellipsoid and then a layer of infinite elements, shown with dashed lines, outside the ellipsoid. The dashed lines are all hyperbolas.

In an illustrative mesh generation procedure for convex surfaces, the first layer of finite-size elements is readily generated by projecting all the nodes on the shell's outer surface the same distance outward along normals to the shell, creating a surface parallel to the shell. The second layer projects the nodes on the parallel surface outward, along normals, to the ellipsoid. It should be noted in this regard that commercially available mesh generators can be applied more generally, including mesh generation for concave surfaces, and will generally employ procedures more efficient than the one described here.

Figure 11:
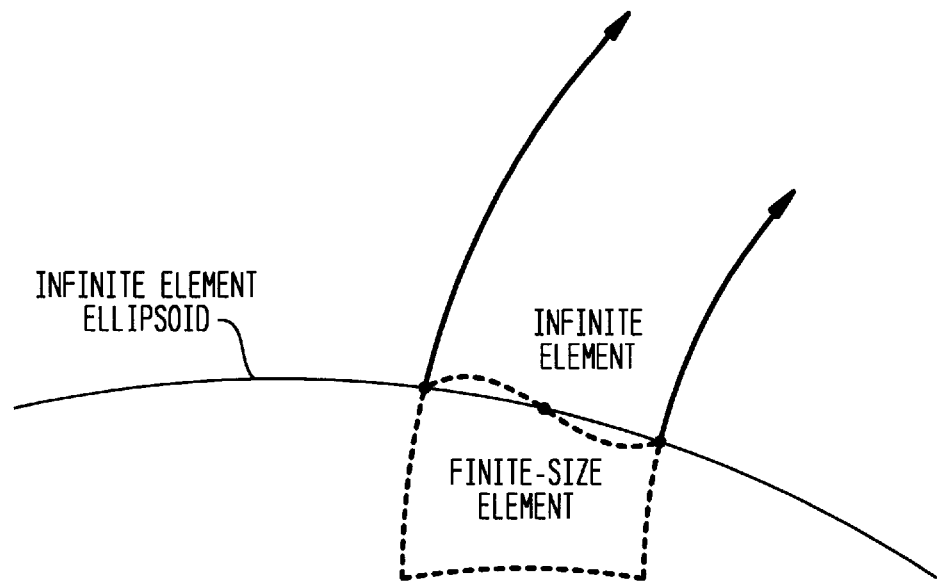
FIG. 11 shows the geometric discontinuity at an interface between adjacent infinite and finite-size elements.

There may or may not be a discontinuity (in $\xi$, $\eta$ coordinates and therefore in the dependent variable, pressure) between the infinite elements and adjacent finite-size elements along the infinite element ellipsoid (FIG. 11), depending on how the geometry for the finite-size elements is generated. If these finite-size elements use a conventional polynomial mapping based on the global Cartesian coordinates of the nodes, then the elements will not conform exactly to the shape of the ellipsoid. However, the mapping in Eq. (7) for the infinite element defines a set of $\xi$, $\eta$ coordinates that lie exactly on the ellipsoid. Thus there is a "sliver" of space, comprising gaps and overlaps, between the finite and infinite elements, and the $\xi$, $\eta$ coordinates in the two elements do not exactly coincide on their interface. This is not a problem because the error due to this geometric discontinuity converges to zero, as the mesh is h or p-refined, at the same rate as does the (well-known) error at the boundary of a curved domain when using conventional polynomial-mapped elements. Indeed, simple numerical calculations show that the maximum spatial separation between identical $\xi$, $\eta$ values on the faces of adjacent finite and infinite elements is typically several orders of magnitude less than internodal distances. (Using blending functions for the geometry of the finite-size elements would, of course, eliminate the discontinuity.)

E. Governing Physics Equations

Time-harmonic ($e^{i\omega t}$) behavior is governed by the 3-D Helmholtz equation, $$\nabla^2 p + k^2 p = 0 \quad (8)$$

where k is the wavenumber ($=\omega/c$), c is sound speed ($=\sqrt{B/\rho}$), B is bulk modulus, $\rho$ is density, and p is the complex-valued amplitude of scattered and/or radiated pressure:

$$p = \begin{cases} p^{scat} = p^{total} - p^{inc} & \text{if scattering} \\ p^{rad} = p^{total} & \text{if radiation} \\ p^{scat+rad} = p^{total} - p^{inc} & \text{if both} \end{cases} \quad (9)$$

To ensure uniqueness of the solution, the pressure must satisfy the Sommerfeld radiation condition at the outer "boundary" at infinity:

$$\frac{\partial p}{\partial r} + ikp = o\left(\frac{1}{r}\right), \quad r \to \infty \quad (10)$$

where the lower case o, read "little o", means "faster than." The r in Eq. (10) is a spherical r. However, ellipsoidal radii approach spherical radii as r→∞, so Eq. (10) can be used with ellipsoidal coordinates in the limit as r→∞.

When Eq. (10) is applied to the outer face of the element $\hat{S}$, at ellipsoidal radius $\hat{r}$, as it recedes to infinity, Eq. (10) can be satisfied by the proper choice of shape functions.

F. Finite Element Representation of Pressure

1. General Expression; DOF Numbering

The scattered and/or radiated pressure is represented as follows, $$p(\xi,\eta,r) = \sum_{j=1}^{N} \psi_j(\xi,\eta,r) P_j \quad (11)$$

where $$\psi_j(\xi,\eta,r) = \psi_v^a(\xi,\eta)\psi_\mu^r(r) \quad v=1,2,...,n; \mu=1,2,...,m \quad (12)$$

$$n \times m = N$$

Here $\psi_v^a(\xi,\eta)$ are "angular" shape functions that interpolate p over ellipsoidal surfaces confocal to the infinite element surface, and $\psi_\mu^r(r)$ are "radial" shape functions that interpolate p along hyperbolic rays. Interelement $C^0$-continuity is established by enforcing the interpolation property:

$$\psi_v^a(\xi_{v'},\eta_{v'}) = \delta_{vv'} \quad (13)$$

$$\psi_\mu^r(r_{\mu'}) = \delta_{\mu\mu'} \quad (14)$$

The currently preferred local node numbering convention is to begin with the nodes on the base of the element and then proceed radially outward, a layer of nodes at a time. This is summarized in Table I and illustrated in FIG. 12.

2. Angular Shape Functions

The functions $\psi_v^a(\xi,\eta)$ are conventional 2-D polynomials (serendipity, Lagrange or hierarchic).

Figure 12:
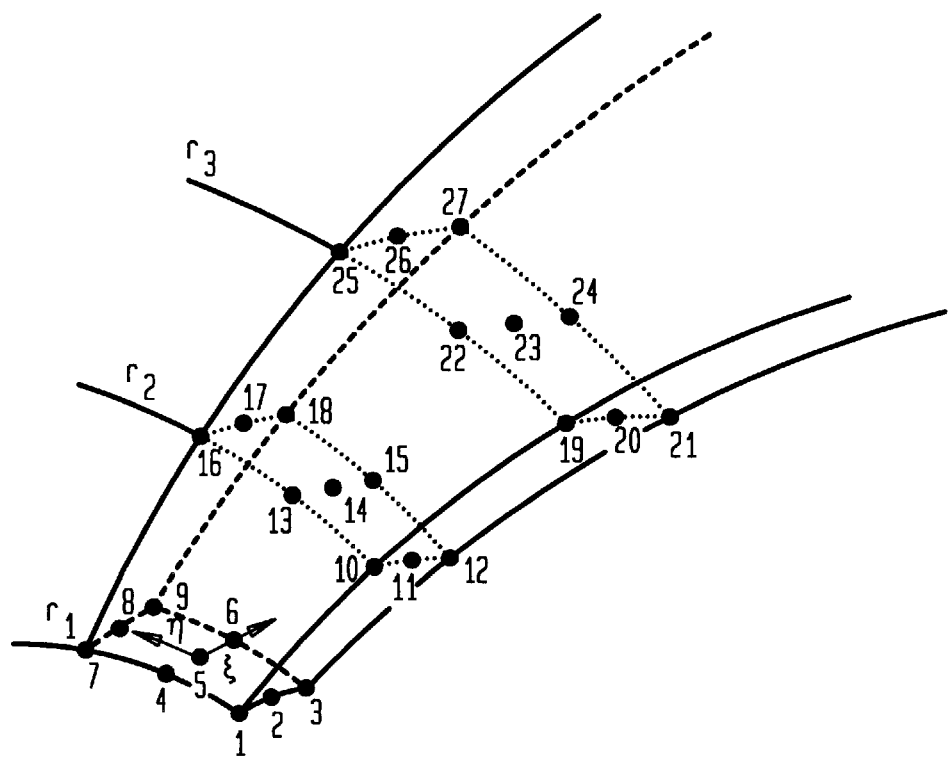
FIG. 12 illustrates a local node numbering convention for the particular case of a quadratic Lagrange quadrilateral ($n=9$) in the angular directions and a quadrupole ($m=3$) in the radial direction ($N = m \times n = 27$).

For example, for the quadratic Lagrange quadrilateral elements depicted in FIGS. 7, 9 and 12, the angular shape functions are $$\psi_\nu^a(\xi, \eta) = \tau_\alpha(\xi)\tau_{\alpha'}(\eta) \quad \nu = 1, 2, ..., 9 \quad (15)$$
$$(\alpha = 1, 2, 3; \alpha' = 1, 2, 3)$$

where $$\tau_1(u) = \frac{1}{2}u(u-1); \tau_2(u) = 1 - u^2; \tau_3(u) = \frac{1}{2}u(u+1) \quad (15A)$$

If the functions $\psi_\nu^a(\xi, \eta)$ are also used for the mapping functions $\chi_\nu^a(\xi, \eta)$ in Eq. (7), then the element is "isoparametric" in the angular directions.

3. Radial Shape Functions

The functions $\psi_\mu^r(r)$ use a truncated form of the radial part of the multipole expansion in Eq. (6), namely, an mth order multipole expansion:

$$\psi_\mu^r(r) = e^{-ik(r-r_\mu)} \sum_{\mu'=1}^{m} \frac{h_{\mu\mu'}}{(kr)^{\mu'}} \quad \mu = 1, 2, ..., m \ (m \geq 2) \quad (16)$$

The phase factor $e^{ikr_\mu}$ does not need to be included; if omitted, it will simply appear in each $h_{\mu\mu'}$ in Eq. (20) below. The factors $k^{\mu'}$ in the denominators are also not necessary; they are included only to make the $h_{\mu\mu'}$ nondimensional.

The coefficients $h_{\mu\mu'}$ are determined by the requirement of interelement $C^0$-continuity. Applying Eq. (14) to Eq. (16) yields m sets of m linear algebraic equations:

$$[H][S]=[I] \quad (17)$$

where $$H_{\mu\mu'}=h_{\mu\mu'}, \quad (18)$$
$$S_{\mu\mu'}=(kr_\mu)^{-\mu'}, \quad (19)$$

and [I] is the identity matrix. Therefore, $$[H]=[S]^{-1} \quad (20)$$

This procedure defines m layers of nodes (with n nodes on each layer) lying on ellipsoids of ellipsoidal radii $r_1, r_2, \ldots, r_m$ (see FIG. 12).

To illustrate, consider a dipole element (m=2), $$\psi_\mu^r(r) = e^{-ik(r-r_\mu)}\left(\frac{h_{\mu 1}}{kr} + \frac{h_{\mu 2}}{(kr)^2}\right) \quad \mu = 1, 2 \quad (21)$$

Inverting a 2×2[S] matrix yields $$[H] = \begin{bmatrix} h_{11} & h_{12} \\ h_{21} & h_{22} \end{bmatrix} = \frac{1}{r_2 - r_1}\begin{bmatrix} -kr_1^2 & k^2 r_1^2 r_2 \\ -kr_2^2 & -k^2 r_1 r_2^2 \end{bmatrix} \quad (22)$$

The procedure in Eqs. (16)–(20) is the one that has been used to date. However, a hierarchic formulation would have the usual advantages of ease of mesh refinement (by p-extension), improved numerical conditioning and elimination of all nodes exterior to the infinite element ellipsoid. The last advantage is especially important because it would eliminate the need to locate nodes on hyperbolic trajectories, which is not a standard technique in FE mesh generators. To convert to a hierarchic formulation, the angular directions would employ the standard 2-D hierarchic shape functions for quadrilaterals and triangles. The radial direction would use the mapping $\zeta=1-2r_1/r$, which linearly maps the interval $1/r \in [1/r_1, 0)$ to the interval $\zeta \in [-1,1)$, and then employ the standard 1-D hierarchic shape functions in $\epsilon$, excluding the linear function that is unity at infinity, i.e., at $\zeta=1$.

4. Stiffness, Mass, and Radiation Damping Matrices, and the Element Matrix Equation 4.1. Formal expressions The matrices for the element matrix equation are derived by starting with a finite-size element, i.e., with the outer face on an ellipsoid of ellipsoidal radius $\hat{r}$ (see FIG. 7), and then taking the limit as $\hat{r}\to\infty$. Thus, applying the Galerkin-weighted residual method to Eq. (8) over a single element yields $$\lim_{\hat{r}\to\infty}\int\int\int(B\nabla^2 p + \omega^2 \rho p)\psi_i dV = 0, \quad i = 1, 2, ..., N, \quad (23)$$

using $k^2=\omega^2\rho/B$ and the test functions $\psi_i$. Although it is useful to use, for test functions, the basis functions $\psi_j$ used in Equation (11) and represented in Equation (23), this is not a unique choice. That is, other test functions may in at least some cases be used to achieve secondary (nonessential) benefits. One example is to use $\psi_i^*$, i.e., the complex conjugates of the $\psi_i$. This choice would reduce the computation time of the $R_i$ integrals (which is already insignificant) in Equation (112), below, by a small amount, but it would double the amount of storage required because of the resulting loss of symmetry in the stiffness and mass matrices.

The first integral is converted into a surface integral and another volume integral using the identity $\psi_i\nabla^2 p = \nabla\cdot(\psi_i\nabla p) - \nabla\psi_i\cdot\nabla p$ the divergence theorem. Substituting Eq. (11) into the volume integrals yields the following element matrix equation:

$$([K]-\omega^2[M])\{P\}=\{F\}, \quad (24)$$

where the stiffness matrix [K], mass matrix [M], and pressure gradient vector {K} are, respectively, $$K_{ij} = \lim_{\hat{r}\to\infty}\int\int\int_{V^{(e)}} B\nabla\psi_i\cdot\nabla\psi_j dV, \quad (25)$$

$$M_{ij} = \lim_{\hat{r}\to\infty}\int\int\int_{V^{(e)}} \rho\psi_i\psi_j dV,$$

$$F_i = \lim_{\hat{r}\to\infty}\int\int_{S^{(e)}} B\psi_i\frac{\partial p}{\partial n}dS.$$

The surface integral for {F} is over the entire boundary of the element, $S^{(e)}$. It is split into two integrals: one over the outer face $\hat{S}^{(e)}$ and the other over the remaining faces $S^{(e)}-\hat{S}^{(e)}$, $$F_i = \lim_{\hat{r}\to\infty}\int\int_{\hat{S}^{(e)}} B\psi_i\frac{\partial p}{\partial n}dS + \lim_{\hat{r}\to\infty}\int\int_{S^{(e)}-\hat{S}^{(e)}} B\psi_i\frac{\partial p}{\partial n}dS. \quad (26)$$

Consider the first integral in Eq. (26). It can be shown that as $\hat{r}\to\infty$, ellipsoids approach spheres, ellipsoidal radii approach spherical radii, $$\partial p/\partial n \to \partial p/\partial r, \text{ and } dS \to r^2\left(\frac{p^2+Q^2-1}{PQ}\right)d\theta d\phi,$$

where r is spherical or ellipsoidal (they are identical in the limit), θ and φ are ellipsoidal angles, and P and Q are functions of θ and φ but not of r [see Eq. (5)]. To evaluate ∂p/∂r as $\hat{r} \to \infty$, substitute Eqs. (11), (12), and (16) into Eq. (10), which yields a stronger form of the Sommerfeld condition, $$\frac{\partial p}{\partial r} + ikp = O\left(\frac{1}{r^2}\right), r \to \infty, \quad (27)$$

where the upper-case O, read "big oh," means "at least as fast as." Substitute ∂p/∂r in Eq. (27) for ∂p/∂n in the first integral. The $O(1/r^2)$ term makes no contribution to the integral because $\psi_i$ is $O(1/r)$ and, as noted above, $dS \propto r^2 d\theta d\phi$ as $\hat{r} \to \infty$. In the remaining term ikp, substitute Eq. (11) for p.

In the second integral in Eq. (26), substitute the balance of linear momentum for ∂p/∂n, i.e., $\partial p/\partial n = \omega^2 \rho u_n$, where $u_n$ is the amplitude of the normal component of particle displacement.

Making these substitutions, Eq. (26) becomes $$\{F\} = -i\omega[C]\{P\} + \{D\}, \quad (28)$$

where $$C_{ij} = \rho c \lim_{\hat{r} \to \infty} \int\int_{\hat{S}^{(e)}} \psi_i \psi_j dS, \quad (29)$$

$$D_i = (\omega \rho c)^2 \lim_{\hat{r} \to \infty} \int\int_{S^{(e)} - \hat{S}^{(e)}} \psi_i u_n dS.$$

The [C] matrix is the radiation damping matrix, representing radiation loss to infinity. The {D} vector permits specification of $u_n$ on the side or bottom faces of the element.

Substituting Eq. (28) into Eq. (24) yields, for the element matrix equation, $$([K] + i\omega[C] - \omega^2[M])\{P\} = \{D\}, \quad (30)$$

where, summarizing, the formal expressions for the stiffness, mass, and radiation damping matrices are, respectively, $$K_{ij} = \lim_{\hat{r} \to \infty} \int\int\int_{V^{(e)}} B\nabla\psi_i \cdot \nabla\psi_j dV, \quad (31)$$

$$M_{ij} = \lim_{\hat{r} \to \infty} \int\int\int_{V^{(e)}} \rho\psi_i\psi_j dV,$$

$$C_{ij} = \rho c \lim_{\hat{r} \to \infty} \int\int_{\hat{S}^{(e)}} \psi_i \psi_j dS.$$

The $D_i$ are zero in virtually all practical applications.

4.2. Transformation of Integrals; Final Expressions

The remaining mathematics transform the integrals in Eq. (31) to expressions that can be numerically evaluated (The $D_i$ integrals are ignored because they are zero in virtually all practical applications.) Following is a brief description of the principal steps.

Transform the integrals in Eq. (31) to ellipsoidal coordinates r, θ, φ.

The differential volume and surface elements are $dV = J_v dr d\theta d\phi$ and $dS = J_s d\theta d\phi$, where $J_v$ is the volume Jacobian and $J_s$ is the surface Jacobian. $J_v$ and $J_s$, as well as the gradient operator, $\nabla$, in $K_{ij}$ in Eq. (31), are expressed in ellipsoidal coordinates. This separates the 3-D integrals for $K_{ij}$ and $M_{ij}$ into products of 2-D "angular" integrals over θ, φ and 1-D "radial" integrals over r, and the 2-D integral for $C_{ij}$ into the product of a 2-D angular integral and a function of r.

Develop final expressions for the angular integrals.

Transform the θ, φ coordinates to local ε,η coordinates using the coordinate mapping in Eq. (7) [see FIG. 9]. The resulting well-defined integrals can be numerically integrated using Gauss rules in the conventional FE manner.

Develop final expressions for the radial integrals for $K_{ij}$ and $M_{ij}$ and radial functionfor $C_{ij}$.

Substitute Eq. (16) into each of the radial integrals and radial function and perform various algebraic operations. Some of the integrals become well-defined Fourier sine or cosine transforms, which can be evaluated by standard algorithms available in many mathematics software packages. The other integrals, as well as the radial function, result in undefined oscillatory terms, which are treated in the next step.

Form final expression for element matrix equation.

All the above expressions, including both the well-defined integrals and the undefined oscillatory terms, are substituted into Eq. (30), the element matrix equation. The parenthetical expression for the three matrices becomes, $$[K] + i\omega[C] - \omega^2[M] = [K^\infty] - \omega^2[M^\infty] + \text{undefined oscillatory terms} \quad (32)$$

where $[K^\infty]$ and $[M^\infty]$ comprise all the well-defined integrals. The undefined oscillatory terms all cancel, leaving as the final form of the element matrix equation, $$[[K^\infty] - \omega^2[M^\infty]]\{P\} = \{D\}. \quad (33)$$

The expressions for $K_{ij}^\infty$ and $M_{ij}^\infty$ are as follows ($D_i$ are zero in virtually all practical applications):

$$K_{ij}^\infty = B[A_{v'v}^{(1)} R_{\mu'\mu}^{(1)} + A_{v'v}^{(2)} R_{\mu'\mu}^{(2)} - \xi_1^2 A_{v'v}^{(3)} R_{\mu'\mu}^{(3)}]$$

$$M_{ij}^\infty = \rho r_1^2 [A_{v'v}^{(1)} R_{\mu'\mu}^{(4)} - \xi_1^2 A_{v'v}^{(4)} R_{\mu'\mu}^{(2)} + \xi_1^4 a_{v'v}^{(5)} R_{\mu'\mu}^{(3)}] \quad (34)$$

where B is bulk modulus, ρ is density, and $\xi_1 = f/r_1$, where $r_1$ is the radius of the infinite element ellipsoid (see FIG. 7).

The angular integrals, $A_{v'v}^{(i)}$, i=1, ..., 5, v',v=1, ..., n, (see Table I) are $$A_{\nu'\nu}^{(1)} = \iint_\sigma P^2 + Q^2 - \frac{1}{PQ} \psi_{\nu'}^a \psi_\nu^a J d\xi d\eta \quad (35)$$

$$A_{\nu'\nu}^{(2)} = \iint_\sigma \left( \frac{Q}{P} \frac{\partial \psi_{\nu'}^a}{\partial \theta} \frac{\partial \psi_\nu^a}{\partial \theta} + \frac{P}{Q} \frac{\partial \psi_{\nu'}^a}{\partial \phi} \frac{\partial \psi_\nu^a}{\partial \phi} \right) J d\xi d\eta$$

$$A_{\nu'\nu}^{(3)} = \iint_\sigma \left( \frac{Q(1-P^2)}{P} \frac{\partial \psi_{\nu'}^a}{\partial \theta} \frac{\partial \psi_\nu^a}{\partial \theta} + PQ \frac{\partial \psi_{\nu'}^a}{\partial \phi} \frac{\partial \psi_\nu^a}{\partial \phi} \right) J d\xi d\eta$$

$$A_{\nu'\nu}^{(4)} = \iint_\sigma \frac{(1+Q^2-P^2)(P^2+Q^2-1)}{PQ} \psi_{\nu'}^a \psi_\nu^a J d\xi d\eta$$

$$= \iint_\sigma \frac{Q^4 - (1-P^2)^2}{PQ} \psi_{\nu'}^a \psi_\nu^a J d\xi d\eta$$

$$A_{\nu'\nu}^{(5)} = \iint_\sigma \frac{Q(1-P^2)(P^2+Q^2-1)}{P} \psi_{\nu'}^a \psi_\nu^a J d\xi d\eta$$

where $$\iint_{\sigma^{(e)}} \cdots d\xi d\eta = \begin{cases} \int_{-1}^{1} \int_{-1}^{1} \cdots d\xi d\eta & \text{for quadrilaterals} \\ \int_0^1 \int_0^{1-\eta} \cdots d\xi d\eta & \text{for triangles} \end{cases} \quad (36)$$

All four integrals in Eq. (35) can be numerically integrated using standard Gauss rules since the integrands are smooth and bounded (including the $$\frac{1}{\sin\theta}$$

term because $J \propto \theta$ as $\theta \to 0$).

The Jacobian, J, is computed from the coordinate mapping in Eq. (7), $$J = \begin{vmatrix} \frac{\partial \theta}{\partial \xi} & \frac{\partial \phi}{\partial \xi} \\ \frac{\partial \theta}{\partial \eta} & \frac{\partial \phi}{\partial \eta} \end{vmatrix} \quad (37)$$

and the derivatives of $\psi_\nu^a$ are evaluated in the conventional finite-element manner, $$\begin{Bmatrix} \frac{\partial \psi_\nu^a}{\partial \theta} \\ \frac{\partial \psi_\nu^a}{\partial \phi} \end{Bmatrix} = [J]^{-1} \begin{Bmatrix} \frac{\partial \psi_\nu^a}{\partial \xi} \\ \frac{\partial \psi_\nu^a}{\partial \eta} \end{Bmatrix} \quad (38)$$

The angles $\theta$ and $\phi$, for the functions $\cos\theta$ and $\cos\phi$, are also computed from Eq. (7).

The radial integrals, $R_{\mu'\mu}^{(i)}$, i=1, ..., 4, $\mu'$, $\mu$=1, ..., m, (see Table I) are $$R_{\mu'\mu}^{(1)} = L_{\mu'\mu} \left[ \frac{1}{2i} b_2 e^{-i2\zeta} + \sum_{\beta=0}^{2m} b_{\beta+2} I_\beta \right] \quad (39)$$

$$R_{\mu'\mu}^{(2)} = L_{\mu'\mu} \sum_{\beta=2}^{2m} c_\beta J_\beta$$

$$R_{\mu'\mu}^{(3)} = L_{\mu'\mu} \zeta^2 \sum_{\beta=2}^{2m} c_\beta J_{\beta+2}$$

$$R_{\mu'\mu}^{(4)} = L_{\mu'\mu} \frac{1}{\zeta^2} \left[ \frac{1}{2i} c_2 e^{-i2\zeta} + \sum_{\beta=0}^{2m-2} c_{\beta+2} J_\beta \right]$$

where $$L_{\mu'\mu} = (1/k) e^{ik(r_{\mu'} + r_\mu)} \quad (40)$$

$$\zeta = kr_1 \quad (41)$$

$$b_\beta = \sum_{\gamma=1}^{\beta-1} a_{\mu'\gamma} a_{\mu,\beta-\gamma} \quad (42)$$

$$c_\beta = \sum_{\gamma=1}^{\beta-1} h_{\mu'\gamma} h_{\mu,\beta-\gamma} \quad (43)$$

$$a_{\mu\alpha} = ih_{\mu\alpha} - (\alpha-1) h_{\mu,\alpha-1} \quad \mu = 1, 2, ..., m \quad (44)$$
$$= 0 \text{ for } \alpha > m+1 \quad \alpha = 1, 2, ..., m+1$$

and $h_{\mu\alpha}$ are determined by Eq. (20), with $h_{\mu 0} = h_{\mu,m+1} = 0$. Also, $$I_0 = \int_{r_1}^\infty (FG - 1) e^{-i2kr} k dr \quad (45)$$

$$I_\beta = \int_{r_1}^\infty \frac{FG}{(kr)^\beta} e^{-i2kr} k dr, \quad \beta \geq 1$$

$$J_0 = \int_{r_1}^\infty \left( \frac{1}{FG} - 1 \right) e^{-i2kr} k dr$$

$$J_\beta = \int_{r_1}^\infty \frac{1}{FG(kr)^\beta} e^{-i2kr} k dr, \quad \beta \geq 1$$

The I integrals can be expressed in terms of the J integrals:

$$I_\beta = J_\beta - (1+p) \zeta^2 \xi_1^2 J_{\beta+2} + p \zeta^4 \xi_1^4 J_{\beta+3}, \quad \beta \geq 0. \quad (46)$$

From Eqs. (39) and (46) it follows that all the I and J integrals can be evaluated by evaluating only the J integrals for $0 \leq \beta \leq 2m+4$. To do so, make the change of variable $x = kr - \zeta$, which converts the integrals to Fourier sine and cosine transforms that can be evaluated by standard algorithms available in many mathematics software packages.

The tensor products $A_{\nu'\nu} R_{\mu'\mu}$ in Eq. (34) are N×N matrices that are constructed by multiplying each term in the m×m [R] matrix by the entire n×n [A] matrix, as shown in Eq. (47). Above and to the left of the matrix are tables showing the relationship of the indices $\mu$ and $\nu$ to j, and $\mu'$ and $\nu$ to i $$\begin{array}{c|ccc|c|ccc|c|ccc|c|ccc}
j & 1 & 2 & \cdots & \vdots & \cdots & \vdots & \cdots & \vdots & \cdots N \\
\mu & \multicolumn{3}{c|}{1} & \vdots & 2 & \vdots & \cdots & \vdots & m \\
\nu & 1 & 2 & \cdots n & \vdots & 1 & 2 & \cdots n & \vdots & \cdots & \vdots & 1 & 2 & \cdots n
\end{array}$$ (47)

$$\begin{array}{c|c|c}
i & \mu' & \nu' \\
\hline
1 & & 1 \\
2 & & 2 \\
\vdots & 1 & \vdots \\
 & & n \\
\cdots & \cdots & \cdots \\
 & & 1 \\
 & & 2 \\
\vdots & 2 & \vdots \\
 & & n \\
\cdots & \cdots & \cdots \\
\vdots & \vdots & \vdots \\
\cdots & \cdots & \cdots \\
 & & 1 \\
 & & 2 \\
\vdots & m & \vdots \\
N & & n
\end{array}
\begin{bmatrix}
R_{11}[A] & R_{12}[A] & \cdots & R_{1m}[A] \\
 & R_{22}[A] & \cdots & R_{2m}[A] \\
 & & \ddots & \vdots \\
\text{symmetric} & & & R_{mm}[A]
\end{bmatrix}$$

Eq. (33), which is the element matrix equation, and its supporting Eqs. (34)–(47) are the equations cited in box 20 of FIG. 1A. These equations are sufficient to implement this invention. They may be coded into any scientific programming language; FORTRAN is currently the most popular choice.

Some practical observations in implementing the above equations into software are as follows. The radial integrals in Eq. (39) are identical for every infinite element in a mesh. The reason for this is that these integrals are independent of angular variables, and they are taken along identical ellipsoidal radial paths, i.e., along confocal hyperbolas emanating from the same ellipsoid.

Therefore, they need to be evaluated only once for a given problem. This makes their computational cost totally insignificant.

Hence, the numerical integration required to generate $[K^\infty]$ and $[M^\infty]$ for each infinite element involves only the evaluation of the 2-D angular integrals, making these 3-D elements as cheap to generate as 2-D elements.

In addition, since the frequency dependence of the element is contained only in the radial integrals, element generation during a frequency sweep is essentially free of cost after the first frequency.

TABLE I

Node Numbering Pattern Relating Nodal (DOF) Index j
To Radial Index $\mu$ And Angular Index $\nu$, N = m × n

|  | j | $\mu$ | $\nu$ |
|---|---|---|---|
| on spheroidal surface at $r_1$ (base of infinite element) | 1 | 1 | 1 |
|  | 2 | 1 | 2 |
|  | . | . | . |
|  | . | . | . |
|  | . | . | . |
|  | n | 1 | n |
| on spheroidal surface at $r_2$ | n + 1 | 2 | 1 |
|  | n + 2 | 2 | 2 |
|  | . | . | . |
|  | . | . | . |
|  | . | . | . |
|  | 2n | 2 | n |

TABLE I-continued

Node Numbering Pattern Relating Nodal (DOF) Index j
To Radial Index $\mu$ And Angular Index $\nu$, N = m × n

|  | j | $\mu$ | $\nu$ |
|---|---|---|---|
| on spheroidal surface at $r_m$ | (m − 1)n + 1 | m | 1 |
|  | (m − 1)n + 2 | m | 2 |
|  | . | . | . |
|  | . | . | . |
|  | . | . | . |
|  | N | m | n |

The invention claimed is:

1. A method for operating a digital computer, having at least one digital memory and at least one data processing element, to simulate the acoustic behavior of a body surrounded by a fluid medium, the body having an outer surface, and the body subjected to given driving conditions, comprising:

a) subdividing at least the fluid medium into a pattern of elements, said pattern to be referred to as a mesh, and storing said mesh in the memory;

b) for each element of the mesh, computing a set of element matrix coefficients, and storing said coefficients in the memory;

c) assembling all of the element matrix coefficients into a system matrix, and storing the system matrix in the memory;

d) in the data processing element, solving the system matrix equation, thereby to create a description of the values assumed by an acoustic field variable throughout the mesh; and e) recording the description in a data-storage device, wherein the subdividing step comprises:

f) constructing an inner boundary of the fluid medium, such that said inner boundary coincides with the outer surface of the body;

g) constructing an ellipsoid, to be referred to as the bounding ellipsoid, which encloses the inner fluid boundary, said construction comprising defining three independent principal dimensions for said bounding ellipsoid; and h) filling a space surrounding the ellipsoid with elements, to be referred to as infinite elements, wherein: (i) each infinite element is bounded by a base, at least three side faces, and an outer face; (ii) each respective base lies on the bounding ellipsoid; (iii) each respective outer face belongs to an ellipsoidal surface confocal with the bounding ellipsoid; (iv) each respective side face is a locus of hyperbolas confocal with the bounding ellipsoid; and (v) the outer face recedes to an infinite ellipsoidal radius.

2. The method of claim 1, wherein the subdividing step further comprises: constructing at least one intermediate layer of finite elements between the inner fluid boundary and the bounding ellipsoid.

3. The method of claim 1, wherein the bounding ellipsoid coincides with the inner fluid boundary.

4. The method of claim 1, wherein the subdividing step further comprises:

a) constructing a geometrical representation of the body; and b) subdividing the body representation into finite elements.

5. The method of claim 1, wherein the bounding ellipsoid is a minimal ellipsoid about the inner fluid boundary.

6. The method of claim 1, wherein the step of computing element matrix coefficients is carried out in such a manner as to satisfy the Sommerfield radiation condition.

7. The method of claim 1, wherein the step of computing element matrix coefficients comprises applying the Helmholtz equation to an approximation of a multipole expansion of an acoustic field variable, wherein said approximation has the property that it converges to the exact solution of said equation as the mesh is refined.

8. The method of claim 1, further comprising, before solving the system matrix equation, adding to said equation loads and boundary conditions subject to which the body is to be driven.

9. The method of claim 1, further comprising, after solving the system matrix equation, displaying a graphical image that conveys information resulting from the solving step.

10. The method of claim 1, wherein no two of said three independent principal dimensions are equal.

11. A machine for simulating the acoustic behavior of a body surrounded by a fluid medium, the body having an outer surface, and the body subjected to given driving conditions, comprising:

a) means for subdividing at least the fluid medium into a pattern of elements, said pattern to be referred to as a mesh;

b) a digital memory element for storing the mesh;

c) digital processing means for computing a set of element matrix coefficients for each element of the mesh;

d) a digital memory element for storing the element matrix coefficients, assembled from all of the elements, as a system matrix;

e) digital processing means for solving the system matrix, thereby to create a description of the values assumed by an acoustic field variable throughout the mesh; and f) means for recording the resulting description of the acoustic field variable, wherein the subdividing means comprise:

g) means for constructing an inner boundary of the fluid medium, such that said inner boundary coincides with the outer surface of the body;

h) means for constructing an ellipsoid, to be referred to as the bounding ellipsoid, which encloses the inner fluid boundary; and i) means for filling a space surrounding the bounding ellipsoid with elements, to be referred to as infinite elements, wherein: (i) each infinite element is bounded by a base, at least three side faces, and an outer face; (ii) each respective base lies on the bounding ellipsoid; (iii) each respective outer face belongs to an ellipsoidal surface confocal with the bounding ellipsoid; (iv) each respective side face is a locus of hyperbolas confocal with the bounding ellipsoid; and (v) the outer face recedes to an infinite ellipsoidal radius.

12. The machine of claim 11, wherein the subdividing means further comprise: means for constructing at least one intermediate layer of finite elements between the inner fluid boundary and the bounding ellipsoid.

13. The machine of claim 11, wherein the bounding ellipsoid coincides with the inner fluid boundary.

14. The machine of claim 11, wherein the subdividing means further comprise:

a) means for constructing a geometrical representation of the body; and b) means for subdividing the body representation into finite elements.

15. The machine of claim 11, wherein the bounding ellipsoid is a minimal ellipsoid about the inner fluid boundary.

16. The machine of claim 11, wherein the means for computing element matrix coefficients are constrained to satisfy the Sommerfeld radiation condition.

17. The machine of claim 11, wherein the means for computing element matrix coefficients comprise means for applying the Helmholtz equation to an approximation of a multipole expansion for an acoustic field variable, wherein said approximation has the property that it converges to the exact solution of said equation as the mesh is refined.

18. The machine of claim 11, further comprising means for displaying a graphical image that conveys information resulting from solving the system matrix.

* * * * *